United States Patent [19]

Hoshi et al.

[11] Patent Number: 5,313,468
[45] Date of Patent: May 17, 1994

[54] SELF-DIAGNOSING SYSTEM FOR RECORDING APPARATUS

[75] Inventors: Takashi Hoshi; Toshiyuki Koshiji; Yukie Iseki; Yoshiaki Sato; Kiichiro Ohgo, all of Kanagawa, Japan

[73] Assignee: Fuji Xerox Co., Ltd., Tokyo, Japan

[21] Appl. No.: 111,376

[22] Filed: Aug. 24, 1993

Related U.S. Application Data

[63] Continuation of Ser. No. 630,587, Dec. 20, 1990, abandoned.

[30] Foreign Application Priority Data

Dec. 21, 1989 [JP] Japan .................................. 1-331945

[51] Int. Cl.$^5$ .............................................. G06F 11/00
[52] U.S. Cl. ....................................... 371/16.4; 371/17
[58] Field of Search .................................. 371/16.4, 17

[56] References Cited

U.S. PATENT DOCUMENTS 4,297,029 10/1981 Carlson ............................. 371/16.4
4,499,581 2/1985 Miazga et al. ..................... 371/16.4

Primary Examiner—Vincent P. Canney
Attorney, Agent, or Firm—Finnegan, Henderson, Farabow, Garrett & Dunner

[57] ABSTRACT

An image recording apparatus consists of a control system including a CPU, an image input terminal, an image processing system, an image output terminal, and a user interface. An I/O controller is provided in each of the above units. During the power-on sequence of the apparatus, the CPU executes an interrupt test for checking whether interrupt processes of the CPU with respect to sync signals are performed correctly, and an I/O port operation test for confirming that an I/O port of each I/O controller functions correctly. When a prescribed button is pressed at the user interface, the CPU enters a diagnostic copy job mode, in which copies are actually produced in the same manner as in a normal copy mode to identify a unit in trouble.

14 Claims, 35 Drawing Sheets

FIG. 12(e)

| SYSTEM STATE | STAND BY (DIAG) |
|---|---|
| SCAN PROFILE | IMAGE AREA<br>SCAN READY<br>SENSOR ENABLE ⎍⎍⎍⎍⎍⎍⎍⎍⎍⎍⎍⎍⎍⎍ |
| U I I | |
| S U I | |
| S Y S | |
| I I T | |
| I P S | PADE SYNC |
| M C B | 793 ▭<br>P/R     (3PITCH) ─────<br>          (2PITCH)<br>FEED ───── |

FIG. 12(f)

| DIAGNOSTIC MODE | | | |
|---|---|---|---|
| VIDEO SIGNAL INTERFACE TEST | | | |
| PRTRUE | GOOD | IIT LINE SYNC (IPS-A) | GOOD |
| IOT PAGE SYNC | GOOD | IIT LINE SYNC (IPS-B) | GOOD |
| IOT LINE SYNC | GOOD | IIT VIDEO CLOCK (IPS-A) | GOOD |
| IOT BYTE CLOCK | GOOD | IIT VIDEO CLOCK (IPS-B) | GOOD |
| SCAN READY | GOOD | IIT PAGE SYNC (IMAGE AREA) | GOOD |
| LEAD EDGE AT REG | GOOD | IMAGE AREA | GOOD |
| SENSOR ENABLE | GOOD | WHITE REFERENCE | GOOD |

EXIT

SELF-DIAGNOSING SYSTEM FOR RECORDING APPARATUS

This application is a continuation of application Ser. No. 07/630,587 filed Dec. 20, 1990, now abandoned.

BACKGROUND OF THE INVENTION

The invention relates to a recording apparatus such as a copying machine and, more particularly, relates to a system for self-diagnosing the recording apparatus in which copy jobs are performed to conduct an automatic fault check and other various checks.

Recording apparatus such as copying machines, facsimile machines, and printers of recent development feature high-quality image reproduction and multiple function performance thanks to the introduction of a computer which provides high control and video data processing technology. Such technology also contributes to improving the reliability of these recording apparatus so remarkably that their features are shared with devices of various other fields.

However, there is no apparatus that is free from trouble. It may fault or stop, or its image quality may be impaired. Causes may be secular change, breakage of parts due to life, parameter setting errors, jamming, toner shortage, and so on. In fact, control of the hardware and software of the recording apparatus, being so sophisticated, requires intervention by specialized service men except for cases in which the user can eliminate the trouble by clearing a jam or replenishing the toner, or the like. Thus, the service man must often check the machine with instruments such as a tester to remove the trouble.

However, a color copying machine capable of processing digital images with various editing functions requires a highly sophisticated control, and thus it is extremely difficult and also time-consuming to identify the trouble with instruments such as a tester and an oscilloscope. With respect to trouble in an electronic circuit, it is necessary to find a defective board because the measure to be taken in such a case is per-board replacement. However, circuit boards installed in a newly developed recording apparatus have a multiplicity of circuit elements such as a central processing unit (CPU), for instance and its complicated inter-board communication requires a time-consuming job of locating a defective board with a tester and the like, making its downtime longer.

To overcome this problem, it is important to reduce service time. The decreased service time leads not only to reduction in machine downtime but also to increasing the number of machines to be taken care of by the service man, thereby contributing to saving the maintenance cost and, in the end, reducing the overall running cost on the part of the user.

While the recording apparatus is generally provided with a self-diagnosing mode (hereinafter referred to simply as "diag. mode" for "diagnostic mode"), the diag. mode of the conventional recording apparatus does not allow the copy function to be performed, thus making it quite inconvenient for the following reason. The user often wishes to copy on a trial basis after a check for identifying a defect or after various adjustments to see if that check or adjustments have been performed as prescribed by the user. Lack of the copy function in the conventional diag. mode does not respond to the user's needs. Thus, in the conventional apparatus it is required, to perform copying for confirmation, that the apparatus exit from the diag. mode and return to the normal copy mode, causing a billing problem.

SUMMARY OF THE INVENTION

The present invention has been made to overcome the above problems. Accordingly, an object of the invention is to provide a self-diagnosing system for a recording apparatus with which a service man can complete his work within a matter of half an hour.

Another object of the invention is to provide a self-diagnosing system for a recording apparatus in which a diag. mode allows the recording apparatus to copy in a manner exactly identical to that of a normal copy mode.

A color image recording apparatus to which the invention is applied includes, as shown in FIG. 1, e.g., five remotes: a system 1; an image input terminal (IIT) 3; an image processing system (IPS) 4; an image output terminal (IOT) 5; and a user interface (UI) 6. In FIG. 1, the solid line shows the flow of control signals and the void line shows the flow of analog or digital video signals. The term "remote" will be described later in detail.

The operation of the system shown in FIG. 1 will be outlined below. IIT 1 includes: a light source; a CCD (Charge-Coupled Device) line sensor that outputs color video signals of the three primary colors B, G, R as reflectance data; and a drive mechanism that moves the CCD line sensor in an auxiliary scan direction (Slow Scan direction; hereinafter referred to simply as "SS direction"). The color video signal, which is an output of the CCD line sensor, is introduced to IPS 4 where it is subjected to predetermined image processing and then color-developed, fused, and outputted as a hard copy at IOT 5.

UI 6 is made up of a hard control panel having hard buttons such as a ten-key pad and a color CRT (Cathode-Ray Tube) having soft buttons. These hard and soft buttons permit the user to specify a desired copy mode.

System 1 has a system CPU (SYS. CPU) 2 for managing the operation of the color image recording apparatus on an integrated basis. SYS. CPU 2 interprets button data inputted from UI 6 to cause IIT 3, IPS 4, and IOT 5 to perform a copy job as specified. SYS. CPU 2 also controls UI 6 to change screens displayed on the color CRT and display data such as the number of copies.

In the system shown in FIG. 1, SYS. CPU 2 executes an interrupt test and an input/output (I/O) port operation test during the sequence of activating the apparatus by turning the power supply on (activation sequence). The interrupt test is to check if interrupts can be processed properly, while the I/O port operation test is to confirm that the I/O port of an I/O controller functions correctly. In a copy operation, the respective remotes are required to perform their own operation in synchronism with each other. To meet this requirement, IIT 3 sends SYS.CPU 2 synchronizing signals indicating the period between the start of moving a carriage on which the CCD line sensor is mounted and the end of its return. Based on these synchronizing signals, SYS. CPU 2 causes the respective remotes to perform the copy operation in synchronism with each other. SYS. CPU 2 processes these synchronizing signals by means of interrupt processing. Therefore, to ensure that the copy operation is performed correctly, the apparatus must be able to process interrupts properly for the synchronizing signals from IIT 3, and, for this reason the interrupt processing check is executed in the activation sequence.

Electronic circuits are arranged in a plurality of boards and the inter-board communication of signals such as the synchronizing signals is carried out by I/O controllers. Thus, because proper copy operation depends on proper I/O controller operation, SYS.CPU 2 checks that the I/O port operates correctly in the activation sequence.

These tests verify that the interrupt processing function and the I/O port operation are proper in the activation sequence of the apparatus. That is, any abnormality, if detected, is displayed on UI 6 so that the user can readily be informed of the abnormality in the interrupt processing performed by SYS.CPU 2 or in the I/O controller. Thus, these tests are of help in removing the abnormality within a short period of time.

SYS. CPU 2 enters a diag. copy job mode when a predetermined button is pressed at UI 6. In the diag. mode, in which a so-called trouble isolation is performed to identify an abnormal remote, and various adjustments are made, the user often wishes to perform a copy operation to isolate the trouble or to check if the adjustments are made as prescribed by the user. It is the diag. copy job mode that responds to such a user need. The diag. copy job mode can perform the same operation as the normal copy operation, allowing not only an easy trouble isolation consuming only a short period of time, but also an easy verification through copying that the image recording apparatus has been set to a condition as desired by the user. The diag. copy job mode of the invention prohibits billing, unlike the conventional diag. mode in which the copy operation after the check or adjustment must be performed in the normal copy mode which requires billing.

BRIEF DESCRIPTION OF THE DRAWINGS

FIGS. 12(a) to 12(g) are interface correlation diagrams showing exemplary sequences of a diag. copy job;

DETAILED DESCRIPTION OF THE PREFERRED EMBODIMENTS

An embodiment of the invention will now be described in detail. The embodiment will be described with a color copying machine as a recording apparatus to which the invention is applied. However, the application of the invention is not limited thereto but may include a printer, a facsimile machine, and various other image recording apparatus.

Before describing the embodiment, the general configuration of the color copying machine, its electric control system hardware and software architectures, copy layer, state division, sequence from the power on state to the stand by state, and the module configuration of the IPS will be described. It should be noted that the configurations of other components such as a video signal processing circuit, an imaging unit, an IOT, UI hardware, and a film projector (FP) are the same as those described in U.S. Pat. No. No. 5,198,909, issued on Mar. 30, 1992. U.S. Pat. No. 5,198,909 and commonly assigned, is hereby incorporated by reference as though set forth at length herein, for a detailed description of those other components of the present invention.

Figure 1:
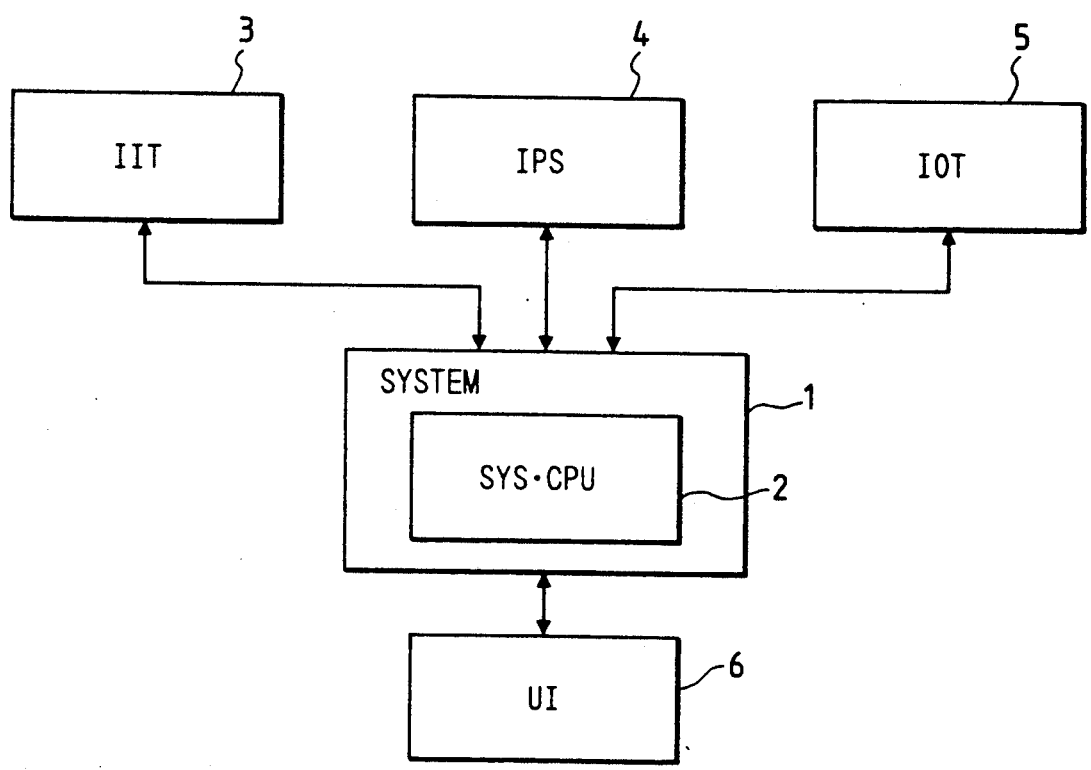
FIG. 1 is a diagram showing an exemplary configuration of a self-diagnosing system for a recording apparatus according to the invention.
Figure 2:
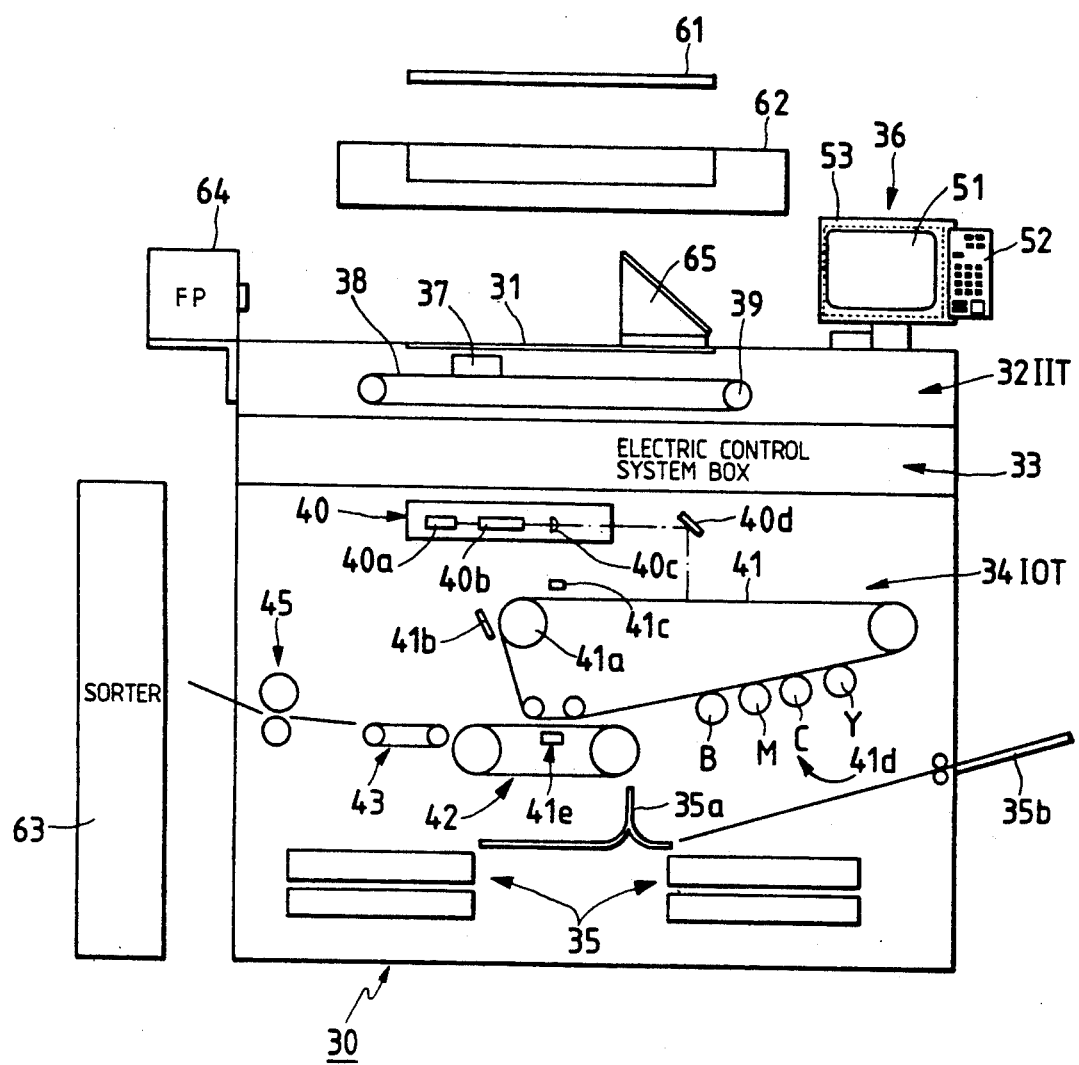
FIG. 2 is a diagram showing an exemplary general configuration of a color copying machine to which the invention is applied.

FIG. 2 is a diagram showing an exemplary general configuration of a color copying machine to which the invention is applied.

The color copying machine includes a base machine 30, which is a basic component. Base machine 30 includes: a platen glass 31 for placing a sheet of document on its upper surface; an IIT 32, an electric control system box 33; an IOT 34; sheet trays 35; and a UI 36. It further includes as options an edit pad 61, an automatic document feeder (ADF) 62, a sorter 63, and a FP 64.

Electric hardware is needed to control the above-described components including the IIT, the IOT, and the UI. Such hardware is divided into a plurality of boards per processing unit such as the IIT, the IPS, the UI, and the FP which are in charge of processing video signals applied from the IIT. This hardware is accommodated in electric control system box 33 together with a control system board (SYS) that controls the above processing units and a master control board (MCB) that controls the IOT, the ADF, the sorter, and the like.

A feature of this color copying machine is direct color copying from color films. The direct color copying is made possible by the arrangement that a film image is projected from FP 64 to a mirror unit (MU) 65 mounted on platen glass 31 and that imaging unit (IU) 37 arranged at IIT 32 reads the projected film image as a video signal. Applicable documents include a negative film, a positive film, and a slide. The color copying machine is also equipped with an automatic focusing device and a device for automatically replacing correction filters.

The electric control system of this color copying machine will be described in terms of its hardware and software architectures and its state division.

This copying machine, using a color CRT as its UI, must handle a larger volume of data than a copying machine using a monochrome CRT not only for color display but also for user-friendly UI featured by special screen design and screen change functions.

CPUs with a large-capacity memory may be used to meet such a requirement. However, this increases the size of the boards, thereby not only complicating their installation in the machine body but also hampering flexible modification in case of a change in the machine specifications, and thus elevating the overall cost.

To overcome the above problems, this color copying machine is designed to accommodate an increase in data volume by introducing a CPU division system. By "CPU division system," it is intended to mean that the CPU is divided into a plurality of "functional units" such as a CRT controller which can be grouped with other models and devices, and each such functional unit is called a remote.

Figure 3:
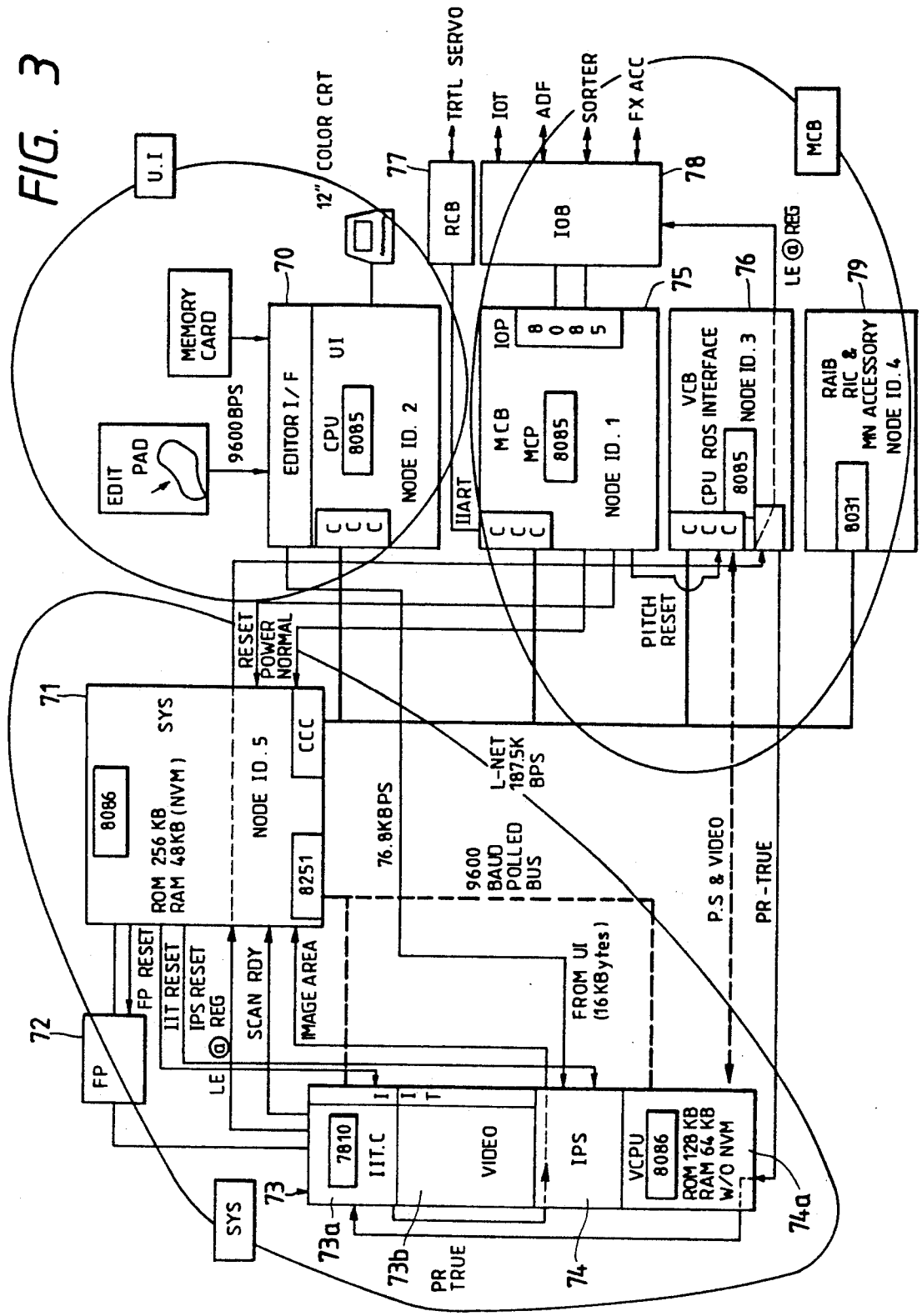
FIG. 3 is a diagram showing a hardware architecture.

As shown in FIG. 3, the electronic hardware is roughly divided into three systems: a UI node, a SYS node, and an MCB node. The UI node includes a UI remote 70. The SYS node includes an FP remote 72 for controlling the FP, an IIT remote 73 for reading a document, and an IPS remote 74 for performing various image processing. IIT remote 73 includes an IIT controller 73a for controlling the IU mounting the CCD line sensor and a video circuit 73b for digitizing read video signals and transmitting the digitized signals to IPS remote 74 and is controlled by a VCPU 74a together with IPS remote 74. A SYS remote 71 is also provided and this remote supervises each of the above-described remotes and other remotes to be described later.

SYS remote 71, demanding an enormous amount of memory to control the screen change of the UI, is made up of a 8086 CPU equipped with a 16-bit microcomputer. Other than the 8086 CPU, a 68000 CPU may also be used.

The MCB node includes a VCB (Video Control Board) remote 76, an RCB remote 77 for servo-controlling a transfer unit, an IOB remote 78 serving as I/O ports for the IOT, the ADF, the sorter, and other accessories, and an accessory remote 79, and these remotes are supervised by an MCB remote 75. The VCB remote 76 functions as a raster output scan (ROS) interface that receives from IPS remote 74 video signals used to form a latent image on a photosensitive belt with a laser beam and transmits the received signals to the IOT.

The thick solid line in FIG. 3 indicates a 187.5 kbps high-speed communication line (LNET); the thick broken line, a 9600 bps master/slave serial communication line; and the thin solid line, a hot line through which control signals are sent. The line marked with 76.8 kbps is a line dedicated to the communication from UI remote 70 to IPS remote 74 of graphic data in the edit pad, copy mode data inputted from a memory card, and graphic data stored in an edit region. Reference character CCC (Communication Control Chip) designates an IC (Integrated Circuit) for supporting a high-speed communication line LNET protocol.

Figure 4:
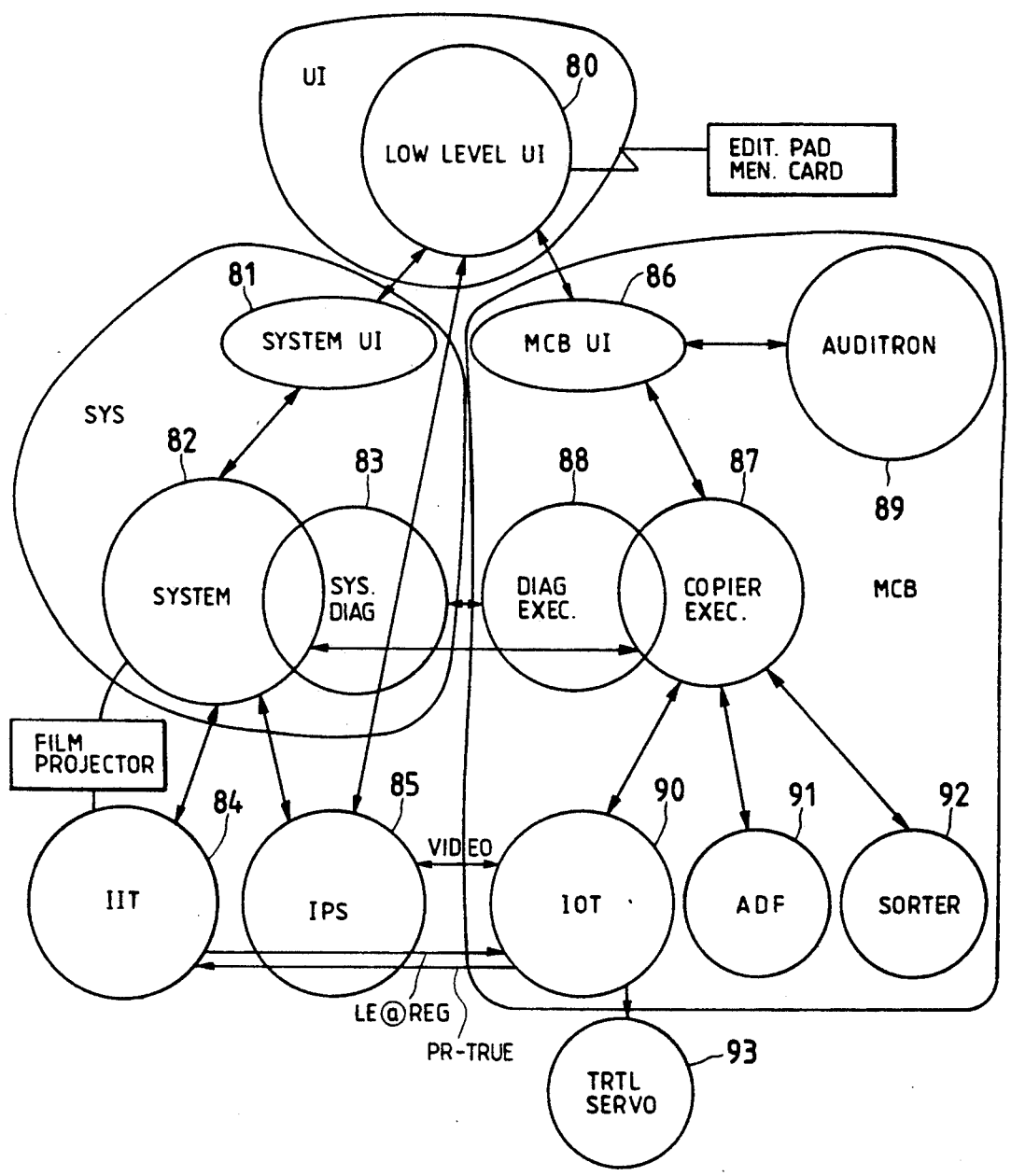
FIG. 4 is a diagram showing a software architecture.

As described above, the hardware architecture of this color copying machine is roughly divided into the three nodes: the UI node, the SYS node, and the MCB node. The division of processing of these nodes will be described with reference to the software architecture shown in FIG. 4. In FIG. 4, the arrows indicate the intercommunication of the data through the 187.5 kbps high-speed communication line LNET and the 9600 bps master/slave serial communication line or of the control signals through the hot line.

UI remote 70 consists of an LLUI (Low Level UI) module 80 and a module (not shown) for processing the edit pad and the memory card. LLUI module 80 is similar in nature to a commonly known CRT controller and is a software module for displaying screens on the color CRT. The selection of screens to be displayed from time to time is controlled by a SYSUI (SYStem UI) module 81 or an MCBUI module 86. It is clear that LLUI module 80 allows UI remote 70 to be grouped with other models and devices, because the CRT controller is used integrally with the CRT, although its screen design and screen change differ from one model to another.

SYS remote 71 consists of three modules: SYSUI module 81, SYSTEM module 82, and a SYS. DIAG module 83. SYSUI module 81 controls screen change. It executes a final check on a job that verifies which coordinates of a soft panel are selected by which screen; i.e., the recognition of the selected copy job, the presence of any inconsistency in the copy execution condition, and the like.

SYSTEM module 82 not only assigns each remote a job by interpreting the copy execution condition sent from SYSUI module 81 and causes each remote to execute its assigned job, but also keeps itself informed of the current state of each remote.

SYS. DIAG module 83 operates in the diag. copy job mode in which the copy operation is performed in a DIAG state, which is a self-diagnosing state. As will be described later, the diag. copy job is designed to be performed in the same manner as the normal copy operation, so that SYS. DIAG module 83 operates in substantially the same manner as SYSTEM module 82. However, SYS. DIAG module 83 is described so as to coincide only in part with SYSTEM module 82 because it is activated under the DIAG state, which is a special state.

IIT remote 73 consists of IIT module 84 for controlling a stepping motor used in the IU and IPS module 85 for performing various IPS-related processing, which modules are controlled by SYSTEM module 82.

On the other hand, MCB remote 75 includes: MCBUI module 86 for controlling UI 36 screen change in the event of DIAG, AUDITRON, and such faults as jamming; an IOT module 90 for controlling the photosensitive belt, the developing device, and the fuser; an ADF module 91 for controlling the ADF; a SORTER module 92 for controlling the sorter; a copier execution (COPIER.EXEC) module 87 that supervises the above-described modules; a diag. execution (DIAG EXEC) module 88 for performing various diagnoses; and an AUDITRON module 89 for processing fare counting by accessing an electronic counter with a password.

RCB remote 77 includes a TRTL.SERVO module 93 for controlling the operation of the transfer unit. TRTL.SERVO module 93, being responsible for the transfer process of a xerography cycle, is placed under control of IOT module 90. In FIG. 4, COPIER.EXEC module 87 and DIAG EXEC module 88 overlap for the same reason as SYSTEM module 82 and SYS. DIAG module 83.

The above division of processing is described in detail along with progress of the copy operation in U.S. application Ser. No. 07/911,806. U.S. patent application Ser. No. 07/911,806, filed Jul. 10, 1992 and commonly assigned, is hereby incorporated by reference as though set forth at length herein, for a more detailed description of the above division of processing (and the six states of the PROGRESS state described below) of the present invention.

The operation of the UI node, the SYS node, and the MCB node at each state of the copy operation will now be described in each sequence.

The operation of the color copying machine is controlled on a state basis. The operation between POWER ON and COPY START, and the operation after COPY END are divided into a plurality of states, each of which has a job to be performed. To ensure efficient and accurate control of the machine operation, there is a rule that no job in a succeeding state will be performed unless the job in the preceding state has been completed. Such a rule is called "state division" and this copying machine is designed to have a state division shown in FIG. 5.

The feature of the state division in this copying machine is that both a control right to supervising an entire state and a UI master right to monopolizing the UI at that state are switched back and forth between SYS remote 71 and MCB remote 75 from time to time. That is, the division of the CPU has allowed LLUI module 80 of UI remote 70 to be controlled not only by SYSUI module 81 but also by MCBUI module 86. In addition, since the processing is divided in such a manner that pitch and copy processing is managed by COPIER.EXEC module 87 of the MCB node while per-original processing and job programming processing are managed by SYSTEM module 82, whether SYSTEM module 82 and COPIER.EXEC module 87 holds the overall control right or the UI master right varies from one state to another. It is COPIER.EXEC module 87 of the MCB node that holds the UI master right in the state shaded in FIG. 5, while it is SYSTEM module 82 that holds the UI master right in other states.

The operation from the POWER ON state to the STAND BY state among the divided states shown in FIG. 5 will be described with reference to FIG. 6.

Upon turning the power supply on to put the machine in the POWER ON state, both an IPS reset signal supplied from SYS remote 71 to IPS remote 74 and an IIT reset signal supplied from SYS remote 71 to IIT remote 73, all shown in FIG. 3, are set to an "H" (high) level, causing both IPS remote 73 and IIT remote 74, released from the reset state, to start. Upon detecting a normal power voltage, a POWER NORMAL signal is activated, causing MCB remote 75 to start, establish both the control right and the UI master right, and perform a high-speed communication line LNET test. The POWER NORMAL signal is also sent from MCB remote 75 to SYS remote 71 through the hot line.

As a predetermined time T0 elapses after MCB remote 75 has been started, a system reset signal supplied from MCB remote 75 to SYS remote 71 through the hot line is set to the "H" level, causing SYS remote 71, released from the reset state, to start. However, SYS remote 71 is started with a delay of 200 $\mu$sec after the time T0 by two internal signals of SYS remote 71, 86NMI and 86RESET. The time 200 $\mu$sec is provided to store the data indicating the machine state in a non-volatile memory (NVM) in cases where the machine is stopped due to a once-through trouble such as a crash, i.e., an instantaneous interruption of the power supply, a software runaway, software bugs, or where the machine runs away.

SYS remote 71, once activated, performs core test of approximately 3.8 seconds to check the ROM, the RAM, and the hardware. If undesired data is inputted during the core test, the machine is likely to run away, so that simultaneously with the start of the core test, SYS remote 71 sets both the IPS and IIT reset signals to an "L" (low) level by itself to cause both IPS remote 74 and IIT remote 73 to reset and stop their operation.

At the end of the core test, SYS remote 71 not only executes a CCC self test within 10 to 3100 msec but also sets both the IPS and IIT reset signals to the "H" level to cause both IPS remote 74 and IIT remote 73 to resume and execute their core tests. The CCC self test starts with sending predetermined data through LNET and ends with receiving the sent data to confirm that the received data is identical to the sent data. A CCC self test time is assigned to respective CCCs so that no CCC self test time will overlap each other. That is, the LNET, under a contention system, allows data to be sent from nodes such as SYS remote 71 and MCB remote 75 at any moment and the same data to be sent again after the elapse of a predetermined time if such data was sent on the line simultaneously. If the LNET is occupied by a node other than SYS remote 71 while SYS remote 71 is executing a CCC self test, a data collision occurs, intercepting the self test. Thus, whenever SYS remote 71 starts a CCC self test, MCB remote 75 is always finished with its LNET test. Upon completion of the CCC self test, SYS remote 71 waits until IPS remote 74 and IIT remote 73 end their core tests and then executes a SYS node communication test during a period T1. This communication test is a 9600 bps serial communication line test and involves transmission and reception of predetermined data in a predetermined sequence. Upon completion of this communication test, a LNET communication test is executed between SYS remote 71 and MCB remote 75 during a period T2. During this test, MCB remote 75 requests a self test result from SYS remote 71, while SYS remote 71 sends MCB remote 75 the requested result of the current self test as a SELF TEST RESULT command.

Upon reception of the SELF TEST RESULT command, MCB remote 75 sends SYS remote 71 a token pass. The token pass is a pass for giving and taking the UI master right, and if the token pass has been given to SYS remote 71, the UI master right is given to SYS remote 71 from MCB remote 75. With the above operation the POWER ON sequence has been completed. During this POWER ON sequence, UI remote 70 not only displays the message "Please wait for a moment" and the like, but also executes various tests of its own such as the core test and the communication tests.

If the request for a self test result is not answered or if abnormality data is found in the self test result during the POWER ON sequence, MCB remote 75 stops the machine, controls UI remote 70, while mobilizing the UI control right, and displays the message that there is an abnormality. This is the MACHINE (M/C) DEAD state.

After the POWER ON state comes an INITIALIZE state for setting each remote up. In the INITIALIZE state, SYS remote 71 holds both the overall control right and the UI master right. Therefore, SYS remote 71 initializes not only the SYS node, but also the MCB node by sending MCB 75 an INITIALIZE SUBSYSTEM command. MCB remote 75 sends back SYS remote 71 its result as subsystem status data. As a result, the IOT heats the fuser and the elevator of a tray is set to a predetermined position so that the machine will get ready to copy. This is the INITIALIZE state.

After the INITIALIZE state, each remote enters a STAND BY state. In the STAND BY state, it is also SYS remote 71 that holds the UI master right. Therefore, SYS remote 71 displays FEATURE FUNCTION (F/F) on a UI screen based on its UI master right and then enters a state in which the copy execution condition is accepted. At this moment, MCB remote 75 is monitoring the IOT. In the STAND BY state, MCB remote 75 sends SYS remote 71 a background poll every 500 msec to check the presence of any abnormality, while SYS remote 71 returns the self test result to MCB remote 75 within 200 msec. If no self test result is returned or the self test result is abnormal, MCB remote 75 informs UI remote 70 of the presence of the abnormality and causes UI remote 70 to display that information.

When AUDITRON is used in the STAND BY state, the machine enters an AUDITRON state. MCB remote 75 controls both AUDITRON and UI remote 70 to display messages for AUDITRON. When the F/F is specified and a start key is pressed in the STAND BY state, the machine enters a PROGRESS state. The PROGRESS state is divided into six states: SETUP, CYCLE UP, RUN, SKIP PITCH, NORMAL CYCLE DOWN, and CYCLE DOWN SHUT DOWN. These six states are described in detail in U.S. patent application Ser. No. 07/398,821, which has already been incorporated above by reference.

Figure 7:
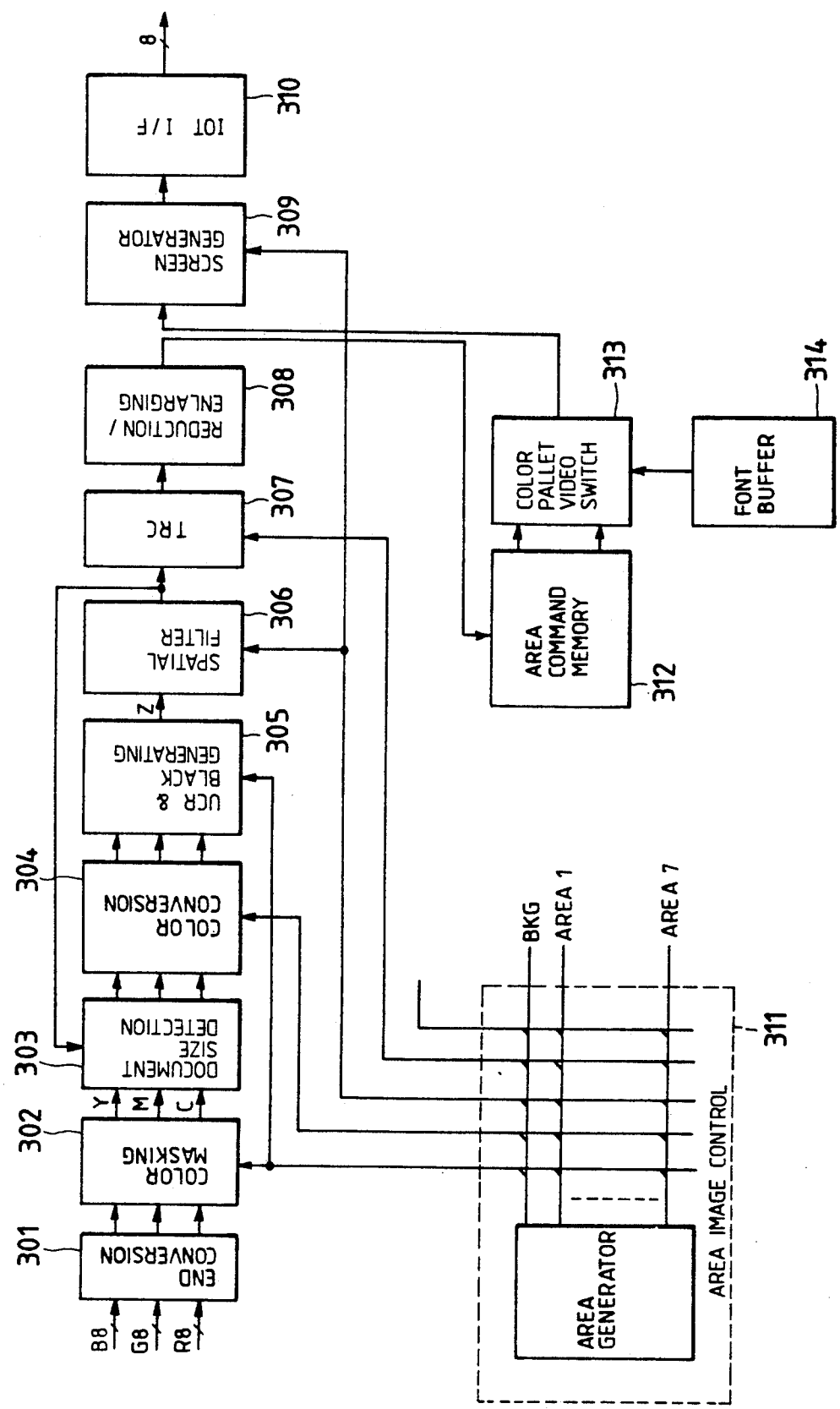
FIG. 7 is a diagram schematically showing the module configuration of an IPS.

FIG. 7 is a diagram schematically showing the module configuration of the IPS.

The IPS inputs 8-bit data (a tone scale of 256 graduations) each to color separation signals B, G, R from the IIT; converts the inputted data into toner signals Y, M, C, K; selects a process color toner signal X; binary-codes the selected toner signal X into on/off data of a process color toner signal; and outputs this on/off data to the IOT. The IPS also performs various processing to enhance reproducibility of such factors as color, tone, and density.

END (Equivalent Neutral Density) conversion module 301 adjusts (converts) color document video signals read by the IIT into gray-balanced color signals. This module has sixteen conversion tables, each of which serves to convert signals, if read from a gray original, into color separation signals B, G, R of tones always corresponding to the read levels (from black to white) and output these converted color separation signals.

Color masking module 302 converts color separation signals B, G, R into toner signals Y, M, C, and performs a matrix operation or conversion table-based calculations.

Document size detection module 303 detects the size of a document at the time of pre-scanning and performs platen color erasure (frame erasure) processing at the time of regular document scanning. If the document is set out of position or is not rectangular, the maximum and minimum values of the upper, lower, right, and left points (x1, x2, y1, y2) are detected and stored.

Color conversion module 304 performs color conversion processing to a specified area by a specified color. Its output depends on an area signal inputted from an area image control module 311 (described later). If the area specified by the area signal is not a color conversion area, this module 304 applies signals Y, M, C of the document as non-converted, and on the other hand, if the area is a color conversion area, it applies color-converted signals Y, M, C by detecting the specified colors.

UCR (Under Color Removal) and black generating module 305 performs processing such as generating a proper amount of component K and reducing amounts of components Y, M, C (under color removing) so that no color will be turbid, contributing to preventing mixture of black and impaired saturation of less light and highly saturated colors.

Spatial filter module 306 generates mesh point removal data and edge enhancing data from digital filters and modulation tables; smoothens the image of photographs, shaded prints, and the like; and subjects characters, line drawings, and the like to an edge enhancing process.

The IOT repeats a copy cycle for four times (in case of four full-color copy operation) by each process color Y, M, C, or K in accordance with the on/off signal from the IPS to reproduce a full-color original. However, to reproduce the colors in the original as theoretically calculated from the signal processing, subtle adjustment with the IOT characteristics taken into account is necessary.

TRC (Tone Reproduction Control) module 307 improves reproducibility and is provided with area signal-based density adjustment, contrast adjustment, negative-positive inversion, color balancing, and editing functions such as character mode and WINDOW synthesis.

Reduction/enlarging processing module 308 reduces and enlarges an image in the main scan direction by thinning or adding the image when data is read/written using a line buffer. This module 308 also shifts the image in the main scan direction by reading the data written in the line buffer from a randomly selected position or with a delayed timing. This image shifting process can be repeated by reading repetitively or inverted for mirror processing by reading the data from backward. In the SS direction, a 50 to 400% reduction/enlarging is available by changing the scan speeds from 2 to ¼ times the IIT scan speed.

Screen generator module 309 converts a toner signal expressing a process color tone into a binary on/off toner signal and outputs the converted signal. This module 309 performs the binary-coding of process color toner signals by comparing a threshold matrix with a data value expressed in graduated tone, together with error diffusion processing. The IOT inputs this binary-coded toner signal and reproduces a half tone image by injecting on and off an oval laser beam of about 80 $\mu$m in diameter and about 60 $\mu$m in width so as to spot an area of 16 dots/mm. The error diffusion processing is performed by comparing the binary on/off tone signal generated by screen generator module 309 with the inputted tone signal to detect any quantization error and by feeding back that error, thereby contributing to improving tone reproducibility when viewed macrographically.

Area image control module 311 has seven rectangular areas, whose specification is prioritized. When an area is specified, this module 311 sets control data for the specified area. The control data include: color conversion data; color mode data that specifies a monochrome or full-color mode; modulation select data that specifies a photograph, a character, or the like; TRC select data; and screen generator select data. These control data are used to control color masking module 302, color conversion module 304, UCR module 305, space filter module 306, and TRC module 307.

An editing control module reads non-rectangular originals such as circular graphs and allows filling processing by filling in a randomly specified area (whose shape is not limited) with a specified color. Commands 0 to 15 are available for such processing as FILL PATTERN, FILL LOGIC, and LOGO.

In short, the IPS of this color copying machine handles an IIT-read signal as follows. The signal is subjected to an END conversion process; color-masked and processed to see if the original is suitable for full-color data processing (i.e., confirmation of the original size and erasure of a frame); color-converted; subjected to an UCR process and a black generation process; and finally processed to obtain desired process color data. For the processing such as space filter, color modulation, TRC, and reduction/enlarging, the use of the process color data contributes to reducing not only the data amount but also the number of conversion tables to that used for the processing with the corresponding full-color data. This, in turn, permits diversification of adjustment to improve adjustment flexibility as well as reproducibility of color, tone, and density of the image.

As described above, this color copying machine is provided with enormously large hardware and software for its sophisticated editing functions. Thus, in the event of a trouble, it is extremely difficult to identify the part in trouble, requiring time-consuming troubleshooting. To help the service man troubleshoot within a short period of time, the machine is equipped with a special diag. mode. The diag. mode allows various tests and adjustments to be performed.

Some diagnoses conducted at the SYS node will be described below.

(1) Auto Fault Check

Two techniques are available to identify the defective part. The service man activates the diag. mode and checks that the machine operates properly, or the machine detects a fault automatically (Auto Fault Check). Two auto fault checks executed by the SYS node will be described below.

(A) Interrupt Test

Upon pressing a start button located on a hard control panel by the user, start button data is sent from LLUI module 80 to SYSUI module 81, which then checks that the copy execution condition contains no inconsistent data. Once the color copying machine is found ready to copy with no inconsistency found in the copy execution condition, the copy execution condition is sent from SYS module 81 to SYSTEM module 82. SYSTEM module 82, in response to the sent copy execution condition, determines a job to be done by each remote and informs each remote of the determined job content. Specifically, IIT remote 73 is instructed to specify the color mode and the number of scan times corresponding to the number of copies as specified; IPS remote 74 is instructed to perform image processing as specified; and the MCB node in charge of developing and fusing is instructed to specify the color mode and the number of copies.

Figure 8A:
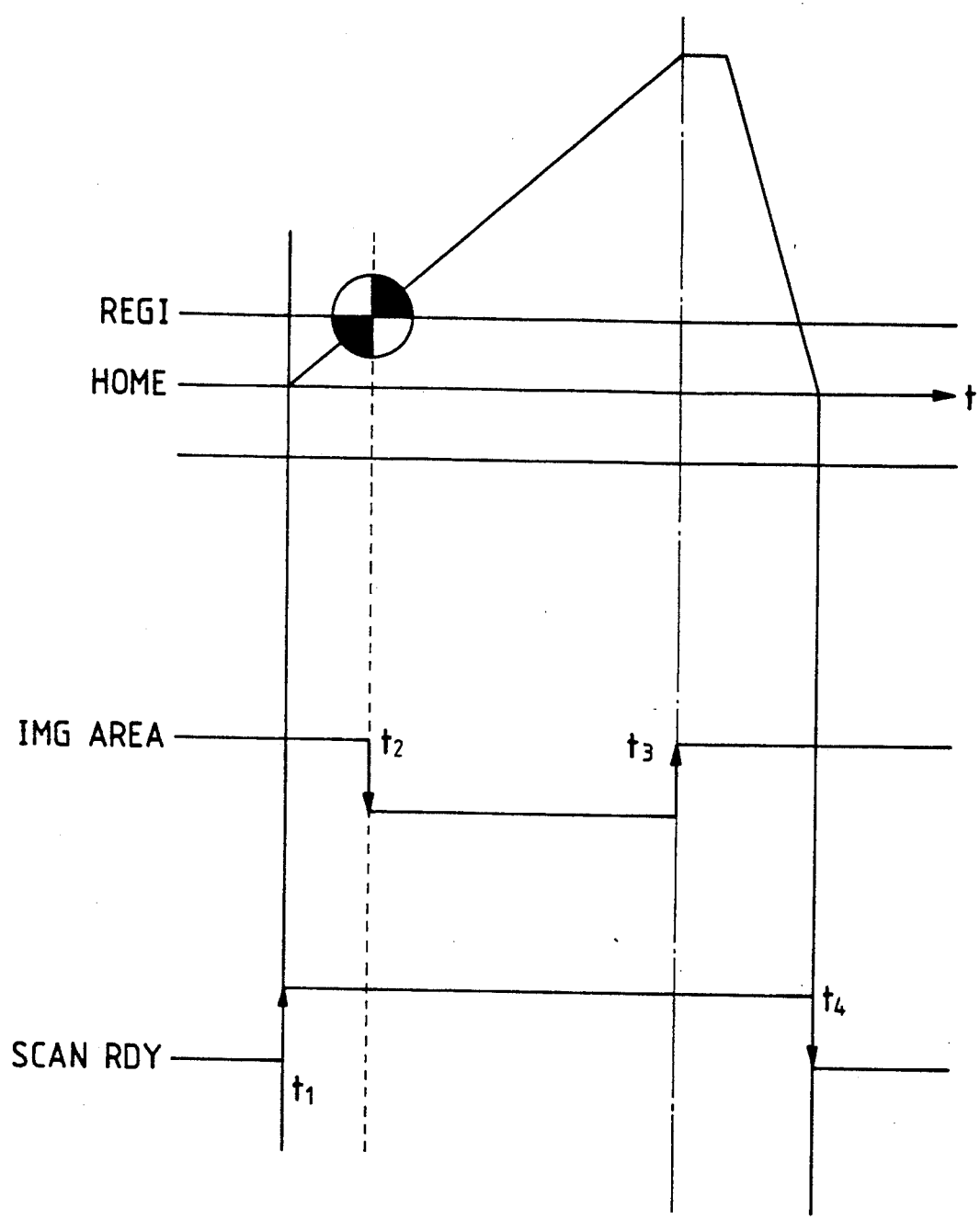
FIGS. 8(a) to 8(d) are diagrams illustrative of interrupt tests.

As a result, the UI starts scanning. Simultaneously therewith, IIT remote 73 sends SYS remote 71 synchronizing signals SCAN RDY and IMG AREA. Their transmission timing is shown in FIG. 8(a), together with IU scan profiles. The SCAN RDY signal is set to, e.g., the "H" level when the IU starts scanning and passes through a home sensor, while the IMG AREA signal is set to, e.g., the "L" level when the IU passes through a registration sensor and starts scanning an image. The IMG AREA signal is set to the "H" level when the IU ends scanning the image, while the SCAN RDY signal is set to the "L" level when the IU returns to pass through the home sensor. Specifically, the rise of the SCAN RDY signal indicates the scan start by the IU, the "H" level indicating that the IU is scanning, and its fall indicating the scan end. The rise of the IMG AREA signal indicates the image reading start, the "L" level indicating that the image is being read, and its fall indicating the image reading end.

These two synchronizing signals are applied to SYS remote 71. To copy, each remote must perform a predetermined operation in synchronism with the scanning and image reading operations performed by the IU, and this requires that no timing error be committed. These two signals SCAN RDY and IMG AREA demand a high level of accuracy for the control of the copying machine, and to meet such a demand, SYSTEM module 82 is designed to process an interrupt. SYSTEM module 82 within a SYSCPU located in SYS remote 71 normally executes routine processing called "BACKGROUND," but accepts predetermined processing while interrupting the background processing upon reception of the SCAN RDY and IMG AREA signals.

Figure 8B:
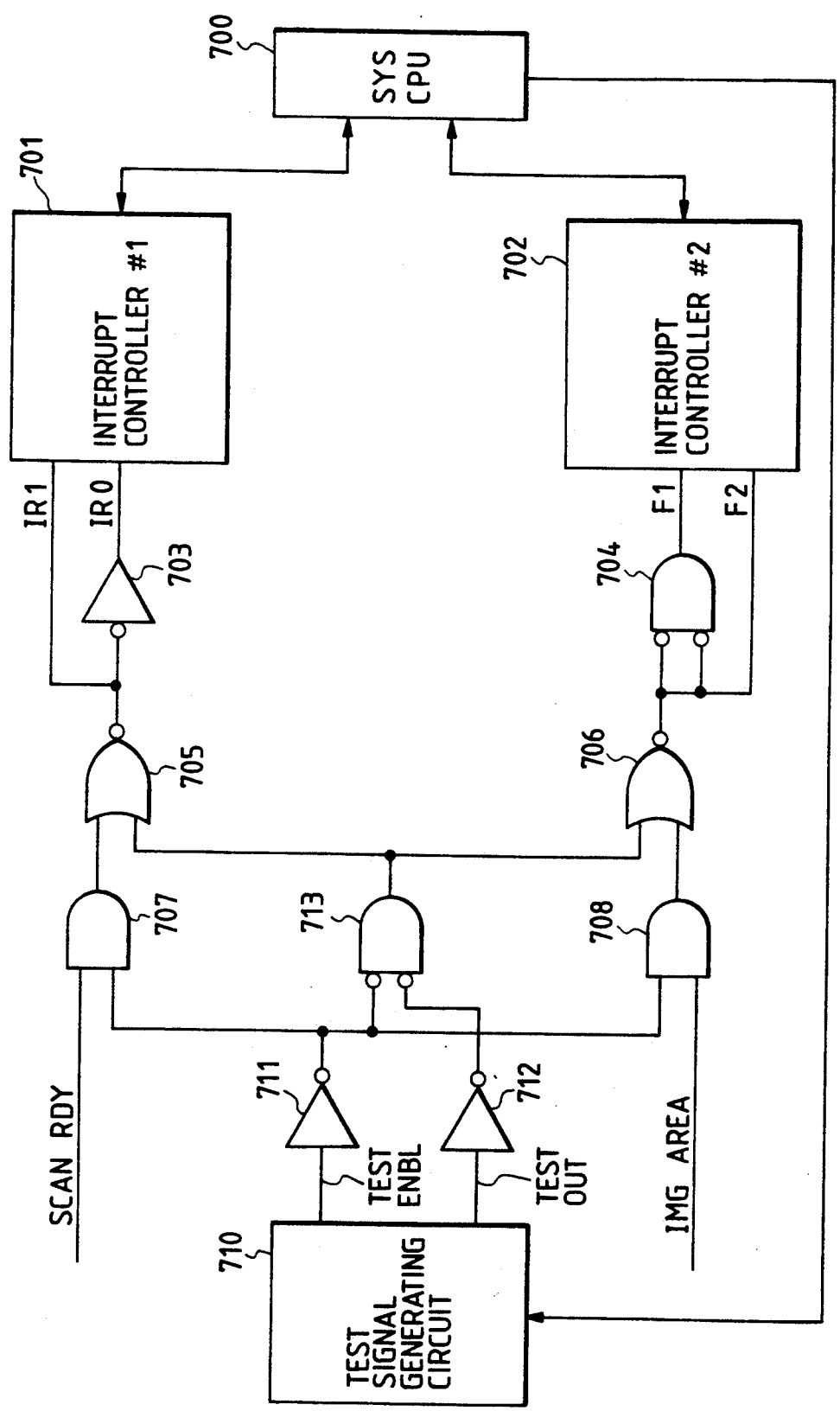

The circuit configuration that allows interrupt processing by the SCAN RDY and IMG AREA signals is shown in FIG. 8(b).

The configuration shown in FIG. 8(b) is of a circuit mounted on the SYS remote 71 board. During normal operation both its TEST ENBL signal and TEST OUT signal outputted from test signal generating circuit 710 are set to the "L" level. Thus, if an invertor 711 output is at the "H" level, an AND circuit 707 output at the "H" level when the SCAN RDY signal is at the "H" level, while an AND circuit 708 output is at the "H" level when the IMG AREA signal is at the "H" level. An AND circuit 713 output is set to the "L" level during the normal operation, and the outputs of NOR circuits 705, 706 depend on the outputs of AND circuits 707, 708. First interrupt controller 701 and second interrupt controller 702 are designed to generate interrupts at the fall of their input signals.

Under such state, IU starts scanning and passes through the home sensor, and as a result, the SCAN RDY signal rises from the "L" to the "H" level. Then, the AND circuit 707 output switches from the "L" to the "H" level while the NOR circuit 705 output switches from the "H" to the "L" level. In response thereto, an IRI terminal of first interrupt controller 701 inverts from the "H" to the "L" level, generating a scan start interrupt (NSCAN RDY). Thus, the NSCAN RDY interrupt is sent from first interrupt controller 701 to SYSCPU 700, which, in turn, informs each remote that the IU has started scanning and that each remote can start its predetermined processing.

As the IU passes through the registration sensor, the IMG AREA signal switches from the "H" to the "L" level, and in response thereto, the AND circuit 708 output inverts from the "H" to the "L" level while the NOR circuit 706 output inverts from the "L" to the "H" level. Therefore, the output of AND circuit 704 whose operation is negative logic-based, i.e., an Fl terminal of second interrupt controller 702, switches from the "H" to the "L" level. As a result, an image read start interrupt, i.e., an IMG AREA interrupt, is generated at second interrupt controller 702. The IMG AREA interrupt is sent from second interrupt controller 702 to SYSCPU 700, which, in turn, informs each remote that the IU has started reading the image.

When the image read operation proceeds to detect the end portion of the document calculated by document size detection module 303 (see FIG. 7) in IPS remote 74, the IMG AREA signal switches from the "L" to the "H" level, and in response thereto, the AND circuit 708 output switches from the "L" to the "H" level while the NOR circuit 706 output, i.e., an F2 terminal of second interrupt controller 702, inverts from the "H" to the "L" level, generating an image read end interrupt (NIMG AREA) at second interrupt controller 702. The NIMG AREA interrupt is sent from second interrupt controller 702 to SYSCPU 700, which, in turn, informs each remote that the IU has ended reading the image.

When the IU has stopped reading the image, it passes through the home sensor, the SCAN RDY signal falls from the "H" to the "L" level, and the AND circuit 707 output switches from the "H" to the "L" while the NOR circuit 705 output inverts from the "L" to the "H" level. In response thereto, the invertor 703 output, i.e., an IR0 terminal of first interrupt controller 701, switches from the "H" to the "L" level, generating a scan end interrupt, i.e., SCAN RDY interrupt, at first interrupt controller 701. The SCAN RDY interrupt is sent from first interrupt controller 701 to SYSCPU 700, which, in turn, informs each remote that the IU has ended scanning. Accordingly, the predetermined processing can be brought to an end by each remote.

The above is the interrupt operation performed by the SCAN RDY and IMG AREA signals. Normally, to generate the four types of interrupts such as described above, four hot lines must be provided to identify the rise and fall of both the SCAN RDY and IMG AREA signals. In the circuit shown in FIG. 8(b), only two signal lines are provided for the SCAN RDY and IMG AREA signals so that the edge of each signal is detected. As a result, the number of hot lines can be reduced, and this also reduces danger of signal line failure such as line breakage.

These four interrupts, the NSCAN RDY interrupt indicating the scan start, the IMG AREA interrupt indicating the image read start, the NIMG AREA interrupt indicating the image read end, and the SCAN RDY interrupt indicating the scan end, are not only of highest priority requiring an extremely high level of accuracy, but also of such nature as to be originated from IIT remote 73 which is installed on a board external to the SYS remote 71 board. The function of the interrupt test is to check that such externally occurring interrupts can be generated properly. Conventionally, the interrupt test has been applied only to intra-board generated interrupt signals, not to externally generated interrupts. However, when the copy operation cannot be performed correctly due to some trouble with the machine, such trouble must be isolated. For a case in which trouble has been found in the SCAN RDY signal system by some other method, there is no other way of isolating the trouble than checking that the SCAN RDY signal has been originated from IIT remote 73 and that the SCAN RDY signal has properly generated an interrupt at SYS remote 71. The interrupt test allows the latter check to be done during the POWER ON sequence. Thus, the interrupt function at SYS remote 71 is checked, and if there is any abnormality, the presence of such abnormality is displayed, permitting not only the integrity of the interrupt operation to be verified easily, but also the abnormality to be easily located at IIT remote 73, not at SYS remote 71, when the abnormality is found either in the SCAN RDY signal line or in the IMG AREA signal line thereafter. That is, this test enables the user to easily locate machine trouble.

An exemplary interrupt test will be described with reference to FIGS. 8(b), 8(c) and 8(d).

Figure 6:
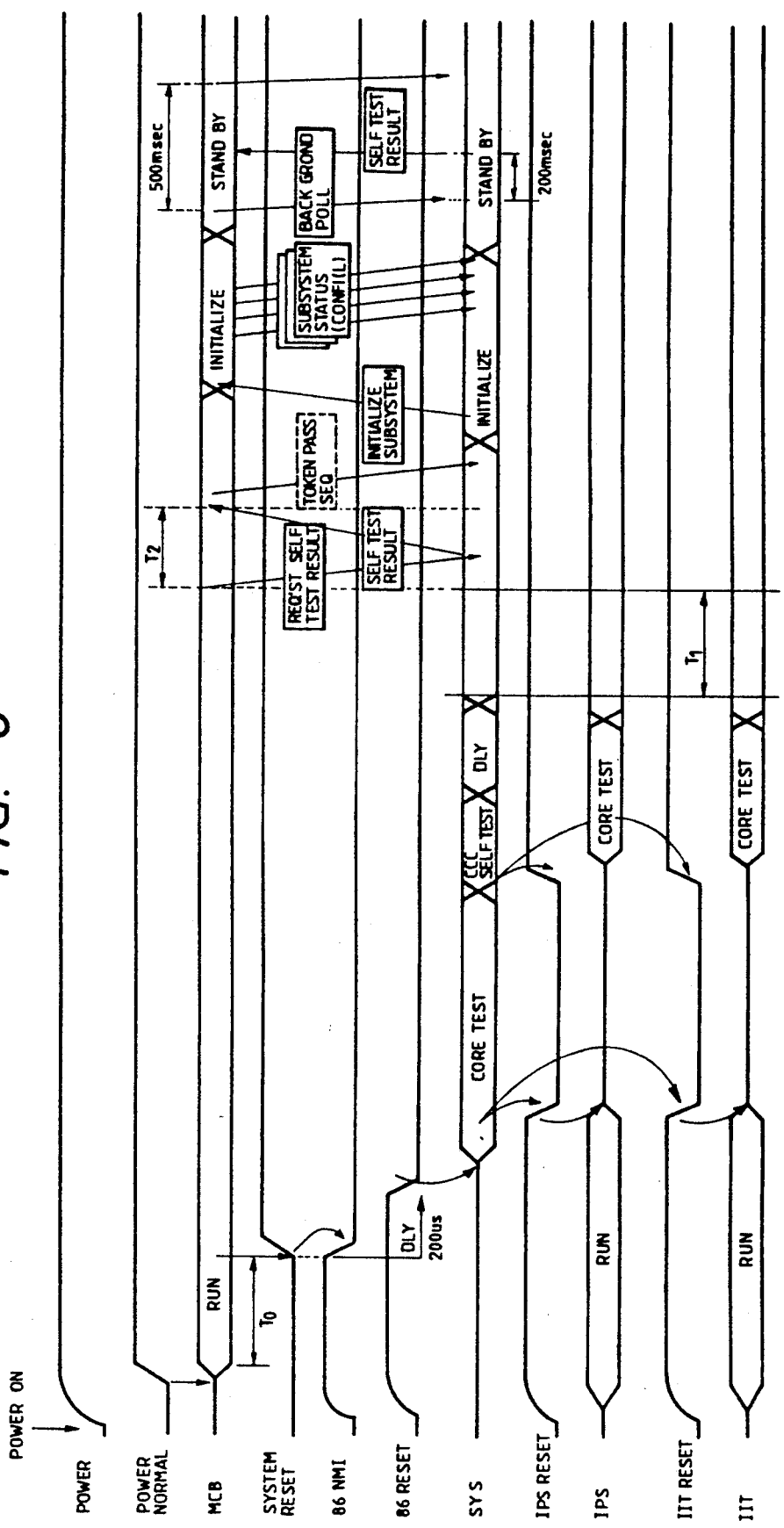
FIG. 6 is a diagram illustrative of sequences from a POWER ON state to a STAND BY state.
Figure 8C:
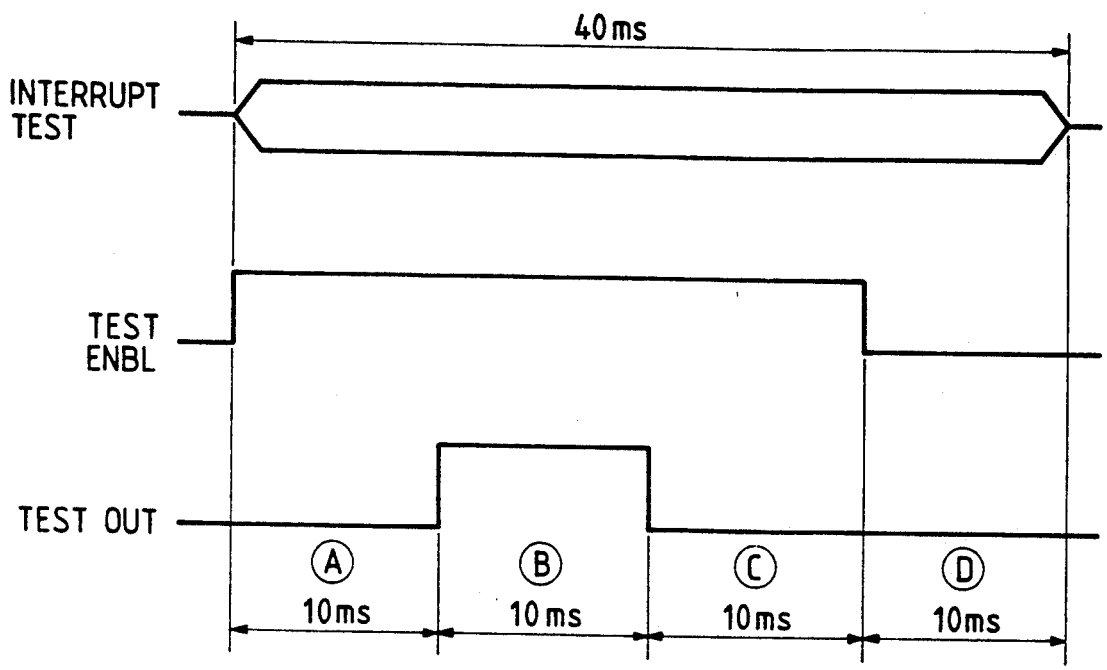
Figure 8D:
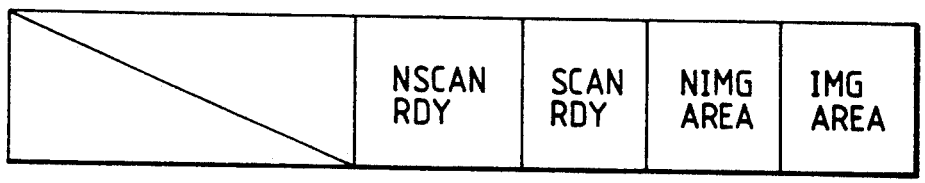

As shown in FIG. 8(c), this interrupt test is executed over 40 msec during a predetermined period in the core test of the POWER ON sequence shown in FIG. 6. When the interrupt test is started, SYSCPU 700 activates test signal generating circuit 710, setting the TEST ENBL signal to the "H" level. As a result, the input of either AND circuit 707 or 708 inverts to the "L" level, causing the level change of the SCAN RDY and IMG AREA signals to be ignored. Then, SYSCPU 700 puts first and second interrupt controllers 701, 702 in the test mode. Both first and second interrupt controllers 701, 702 have three modes: an invalidate mode for performing no interrupt processing, a test mode for performing interrupt processing for the interrupt test, and a normal mode for performing interrupt processing during the normal operation. Upon start of the POWER ON sequence, the invalidate mode is activated, prohibiting the interrupt processing even if the SCAN RDY and IMG AREA signals are sent from IIT remote 73. To execute an interrupt test, the interrupt processing must be performed. However, the interrupt processing for the interrupt test is different from that in the normal copy operation in that it only requires the detection that an interrupt has been generated. For this reason, the special test mode is required. The above is the operation performed within a period designated by reference character A in FIG. 8(c).

After waiting for 10 msec from the rise of the TEST ENBL signal, SYSCPU 700 instructs test signal generating circuit 710 to set the TEST OUT signal to the "H" level. This switches the AND circuit 713 output from the "H" to the "L" level, requesting a SCAN RDY interrupt from first interrupt controller 701 and an IMG AREA interrupt from second interrupt controller 702. At this moment, since both first and second interrupt controller 701, 702 are set in the test mode, the requested interrupts are processed as an interrupt during the interrupt test. Specifically, first interrupt controller 701 checks that the interrupt has been generated in response to the SCAN RDY interrupt request and informs SYSCPU 700 of the result. As shown in FIG. 8(d), SYSCPU 700 writes "1" to the SCAN RDY bit of a predetermined register reserved in advance to store the test result if the interrupt has been generated and writes "0" if not. The IMG AREA interrupt request from second interrupt controller 702 is similarly processed, causing SYSCPU 700 to write "1" to the IMG AREA bit if the interrupt has been generated and "0" if not. The above is the operation performed during the period designated by B in FIG. 8(c).

Upon end of the period B in FIG. 8(c), SYSCPU 700 instructs test signal generating circuit 710 to set the TEST OUT signal to the "L" level. As a result, the AND circuit 713 output inverts from the "L" to the "H" level, requesting a NSCAN RDY interrupt from first interrupt controller 701 and a NIMG AREA interrupt from second interrupt controller 702. These interrupt requests are similarly processed by checking that the interrupts have been generated and causing SYSCPU 700 to write "1" in both the NSCAN and NIMG AREA bits in FIG. 8(d) if the interrupts have been generated and "0" if not. Upon completion of the above operation, SYSCPU 700 sets both first and second interrupt controllers 701, 702 to the invalidate mode, checks the register shown in FIG. 8(d) and writes "0" to a test fail register reserved to store the overall interrupt test result if at least one "0" is found in the register shown in FIG. 8(d). The above is the operation performed during the period designated by C in FIG. 8(c).

Upon end of the period C in FIG. 8(c), SYSCPU 700 instructs test signal generating circuit 710 to set the TEST ENBL signal to the "L" level, validating the level change of the SCAN RDY and IMG AREA signals from IIT remote 73. Even in such a state, however, no interrupt can in any way be generated since both first and second interrupt controllers 701, 702 are set to the invalidate mode. The interrupt test is brought to an end after 10 msec from the TEST ENBL signal having switched to the "L" level.

The interrupt test result is transmitted to MCB remote 75 together with a SELF TEST RESULT command at a sequence shown in FIG. 6. MCB remote 75 remains inoperative when the test fail register contains "1" assuming that the interrupt function is normal, while when the test fail register contains "0", MCB remote 75 informs UI remote 70 of such result and causes the latter to display a message to that effect. Accordingly, the user or the service man can be informed of the presence of an abnormality in the interrupt function of SYS remote 71. This offers quick troubleshooting.

As described above, the interrupt test of the invention is to check that an interrupt is properly generated in response to an externally applied request for the interrupt using an internally generated pseudo-interrupt signal, thereby allowing the trouble to be isolated easily. Thus, the interrupt test can help remove the abnormality quickly. If the interrupt test finds the interrupt function improper, the machine returns from the POWER ON state to the M/C DEAD state as shown in FIG. 5 and the machine is stopped, thereby preventing erroneous operation of the machine due to defective interrupt controller operation or mechanical breakage.

(B) I/O Port Test

Each remote board has an I/O controller for controlling the inter-board communication of various signals. For example, the I/O controller receives a signal from, e.g., a sensor, sends it to the CPU, and sends a signal to a motor or circuits of other boards in response to a CPU instruction. It is the I/O port test that checks that the I/O port of each I/O controller can perform its on/off operation correctly. The I/O port test also permits easy trouble isolation. When a signal line trouble occurs, it must be checked whether the signal has been generated in the line. If the signal has not been generated, the trouble is located at the signal generating source. If the signal has been generated, it is assumed that the input port of the signal receiving side has malfunctioned. The I/O port test, being as such, is applied to the I/O controller of each board at the POWER ON sequence. Once it is confirmed that the I/O port functions properly at the outset, any signal line trouble can be located as being at the signal generating source, thereby isolating the trouble easily. In addition, the I/O port test is executed at the POWER ON sequence, and in the event of such trouble as erroneous operation of the machine due to defective I/O port operation and mechanical damage, the machine returns from the POWER ON state to the M/C DEAD state, causing itself to stop. Therefore, machine malfunction and mechanical damage due to the machine malfunction can be prevented.

Figure 9A:
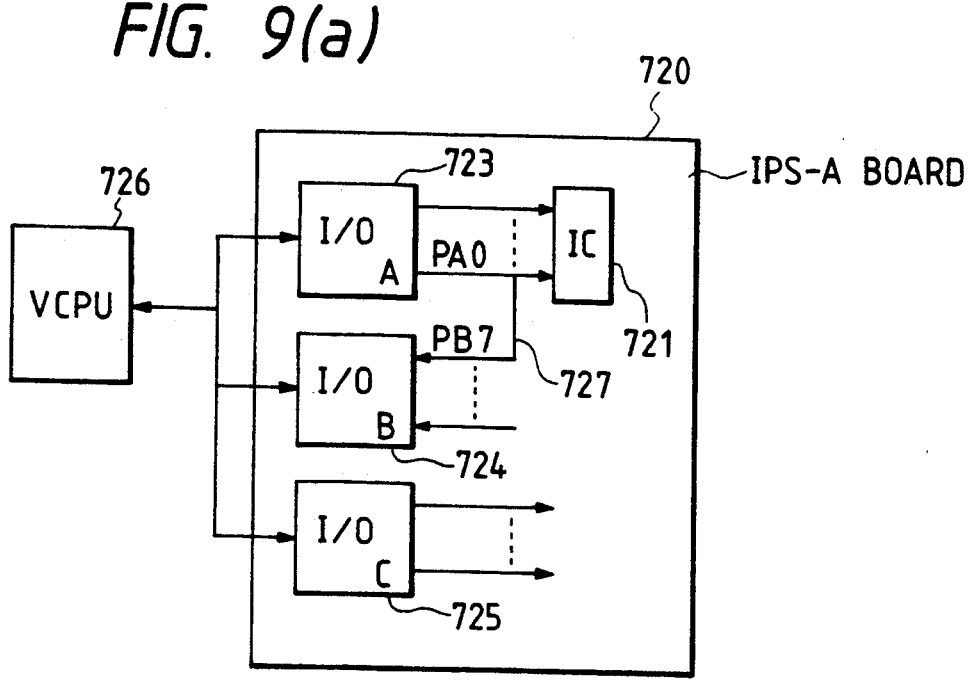
FIGS. 9(a) and 9(b) are diagrams illustrative of I/O port tests.
Figure 9B:
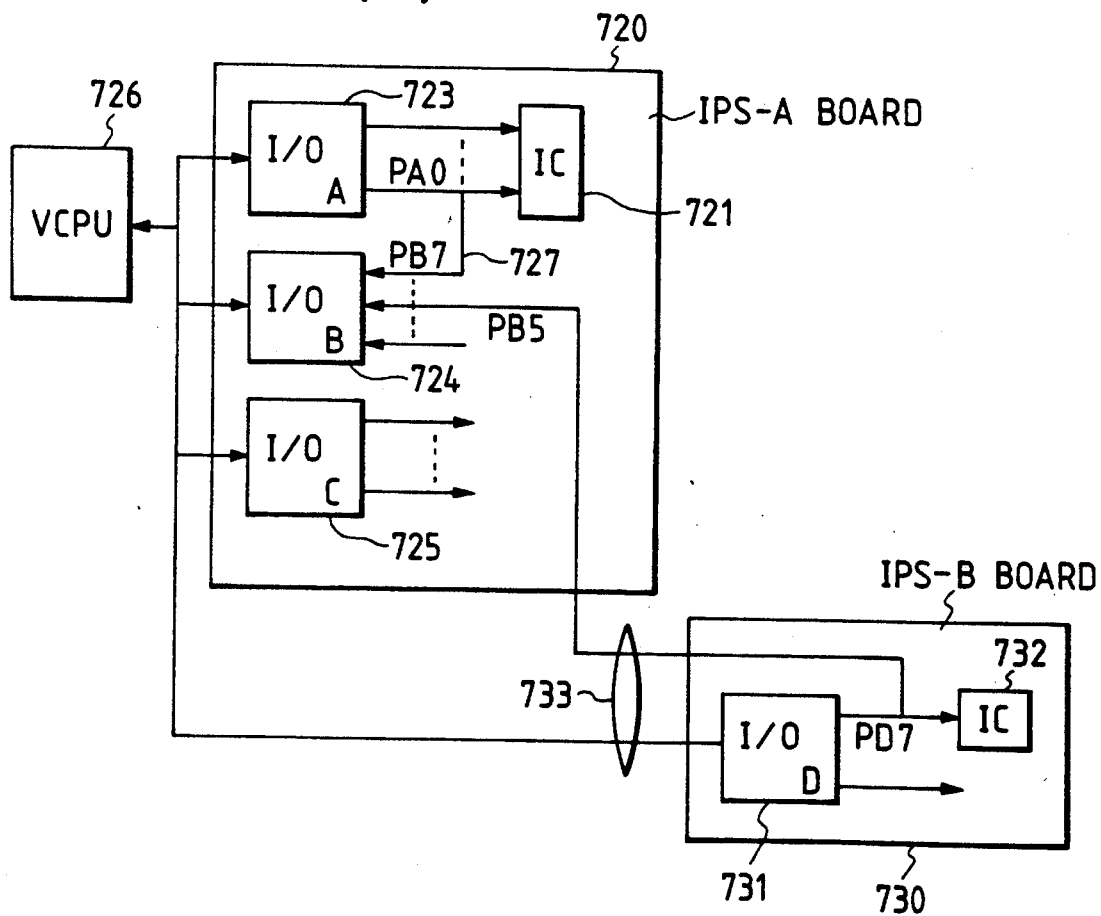

An exemplary I/O port test will be described with reference to FIGS. 9(a) and 9(b). In FIGS. 9(a) and 9(b), it is supposed that VCPU for controlling IPS remote 74 is different from the IPS circuit shown in FIG. 7 and that the IPS circuit shown in FIG. 7 is made up of two boards: an IPS-A board and an IPS-B board.

In FIG. 9(a), IC 721 on IPS-A board 720 is connected to VCPU 726 through I/O controller 723. Both I/O controllers 724, 725 are connected to ICs (not shown). It is supposed that I/O controller 724 is arranged as an input line and that I/O controller 725 is arranged as an output line.

The I/O port function check on the input line I/O controller involves the processes of directly inputting predetermined data to the register of I/O controller 724 by VCPU 726, reading the inputted data, and comparing the read data with preset data. On the other hand, the I/O port function check on the output line I/O controller 723, in which VCPU 726 cannot input predetermined data directly to its register, involves the process of inputting the predetermined data to the register of I/O controller 724 by branching the signal from an appropriate port of I/O controller 723, e.g., a PA0 bit, to a vacant port of I/O controller 724, e.g., a PB7 bit (designated as 727 in FIG. 9(a)). Therefore, VCPU 726 reads the data inputted to the register of I/O controller 724 and compares that read data with preset data, thereby checking the output line I/O controller. Although not shown in FIG. 9(a), the I/O port test may, of course, be applied similarly to I/O controller 725.

Specifically, VCPU 726 activates the I/O port test at a predetermined timing during the IPS core test at the POWER ON sequence as shown in FIG. 6. VCPU 726 first sets the PB0 bit of I/O controller 723 to the "H" level and then checks the PB7 bit of I/O controller 724. If the PB7 bit is set to the "H" level, the I/O port function is normal, while if set to the "L" level, it is abnormal, thereby writing "0" to the test fail register that is provided to store the I/O port test result.

The I/O port test is completed at this point in FIG. 9(a). However, if a signal is transmitted from a bit of I/O controller 725 to a bit of I/O controller 724, a predetermined bit of I/O controller 725 is set to the "H" level and a predetermined bit of I/O controller 724 is checked. If the latter bit is at the "L" level, data "0" is written to the test fail register, confirming that the I/O port function is abnormal. The I/O port test will be completed when the above processing is applied to all the bits to which the test is directed.

Upon completion of the I/O port test, VCPU 726 sends the SYSCPU (not shown) the content of the test fail register as the test result. The SYSCPU then sends the MCB the test result as received together with a SELF TEST RESULT command. The MCB then judges the test result content and if there is an abnormality, it causes the UI to display a message to that effect. Therefore, the I/O port test allows the user or the service man to readily confirm that the I/O port of the I/O controller is in trouble.

A one-bit check per I/O controller suffices in the I/O port test, because once the I/O controller is in trouble, all the bits become abnormal and thus it rarely happens that only one port functions properly. In other words, if it is confirmed that one port of the I/O controller functions properly, it is very likely that the I/O controller can function properly.

The correct operation of the I/O controller can be checked in the above manner, with an inexpensive arrangement requiring that only one signal line be branched.

While the exemplary test on the I/O controller of the IPS-A board has been described above, the I/O port test may, of course, be applied similarly to the I/O controllers of other remotes.

As shown in FIG. 9(b), the I/O port test can be executed on an inter-board basis to check the inter-board interlocking and connection including connectors.

In FIG. 9(b), IC 732 on IPS-B board 730 is connected to VCPU 726 through I/O controller 731, and one of the I/O controller 731 outputs, e.g., a PD7 bit, is transmitted to a vacant bit, e.g., a PB5 bit, of the input line I/O controller 724 on IPS-A board 720. According to this arrangement, VCPU 726 similarly sets the PD7 bit of I/O controller 731 to the "H" level and checks the level of the PB5 bit of I/O controller 724, thereby checking not only both I/O controllers 731, 724 but also the interconnection between IPS-A board 720 and IPS-B board 730 as well as interconnection of wire 733 and its connectors.

As described above, the I/O port test can be executed easily by transmitting a signal from an appropriate bit of an I/O controller designated as an output line and inputting such a signal to a vacant bit of an I/O controller designated as an input line. While the I/O port test is applied to the I/O controllers which are physically different from each other in the above embodiment, it may, of course, be applied to a single I/O controller that allows arbitrary designation of one of its ports as an input line and the other as an output line.

(2) Diag. Copy Job

The copying machine is subjected to various troubles. Some troubles relate to the interrupt function, and the malfunction of the I/O port of the I/O controllers can automatically be detected by the above described Auto Fault Check during the POWER ON sequence. However, the Auto Fault Check cannot detect all the troubles. Thus, the service man may, in some cases, have to make a copy by operating the machine or may cause the machine to perform the copy operation by operating some remotes jointly to locate the fault. Although the diag. mode has a function of arbitrarily modifying parameter values stored in the NVM, to check that the machine is ready to take a desired copy with the modified parameter values, the user must make a copy on a trial basis. Thus, the copy operation performed in the DIAG state is the diag. copy job.

To activate the diag. copy job, the machine must be put in the DIAG state. The operation of the machine will be described in sequence starting with DIAG ENTRY.

(A) DIAG ENTRY

Figure 5:
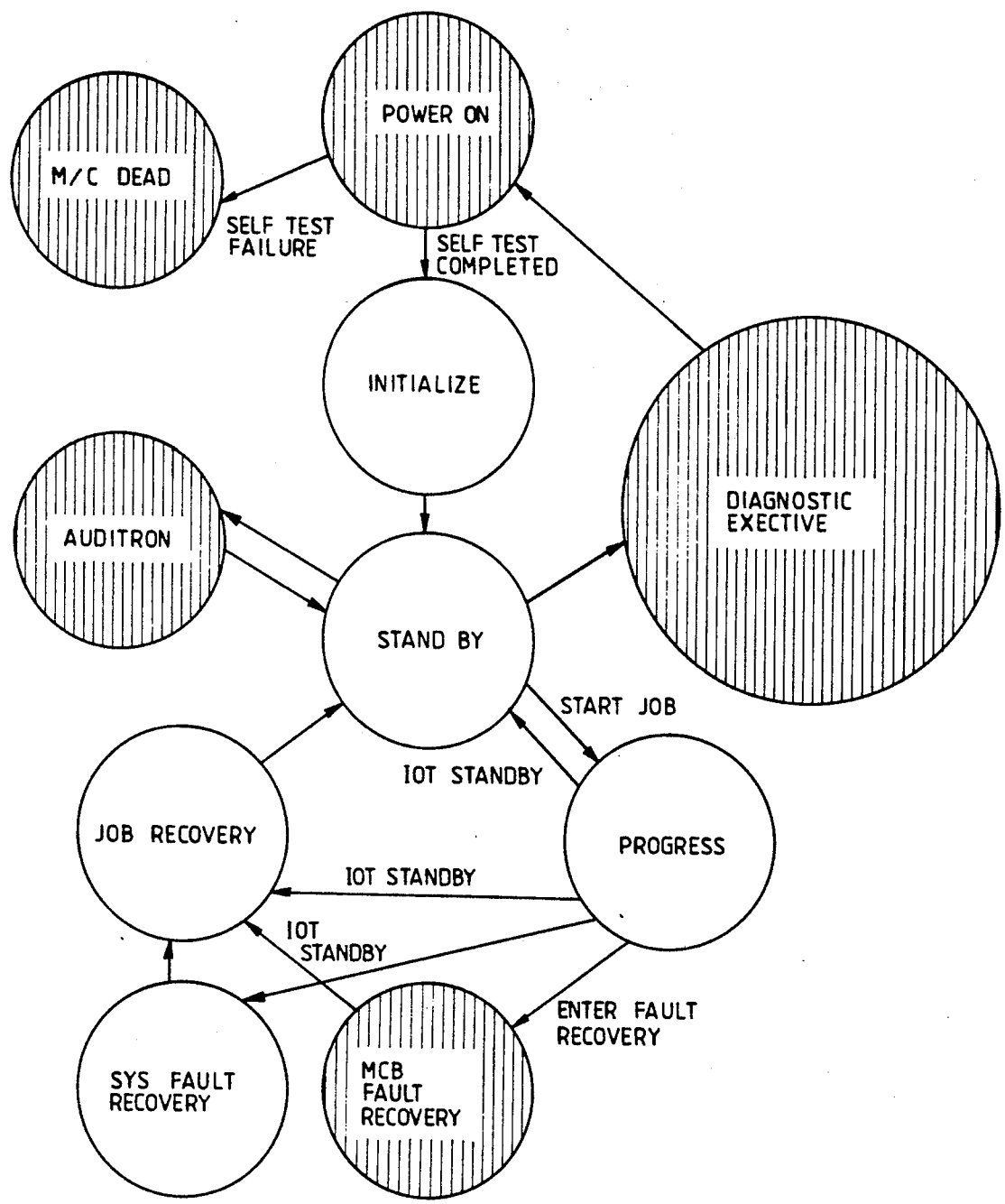
FIG. 5 is a diagram showing a state division.

With respect to DIAG ENTRY, i.e., the operation of causing the machine to enter the DIAG state, there are two occasions: one is that the service man enters the DIAG state with an intention of removing trouble or adjusting the machine in the STAND BY state as shown in FIG. 5, and the other is that the machine, upon activation, automatically enters the DIAG state with an MCB remote instruction.

A case in which the machine in the STAND BY state is intentionally put in the DIAG state by the service man will be described first.

Figure 10:
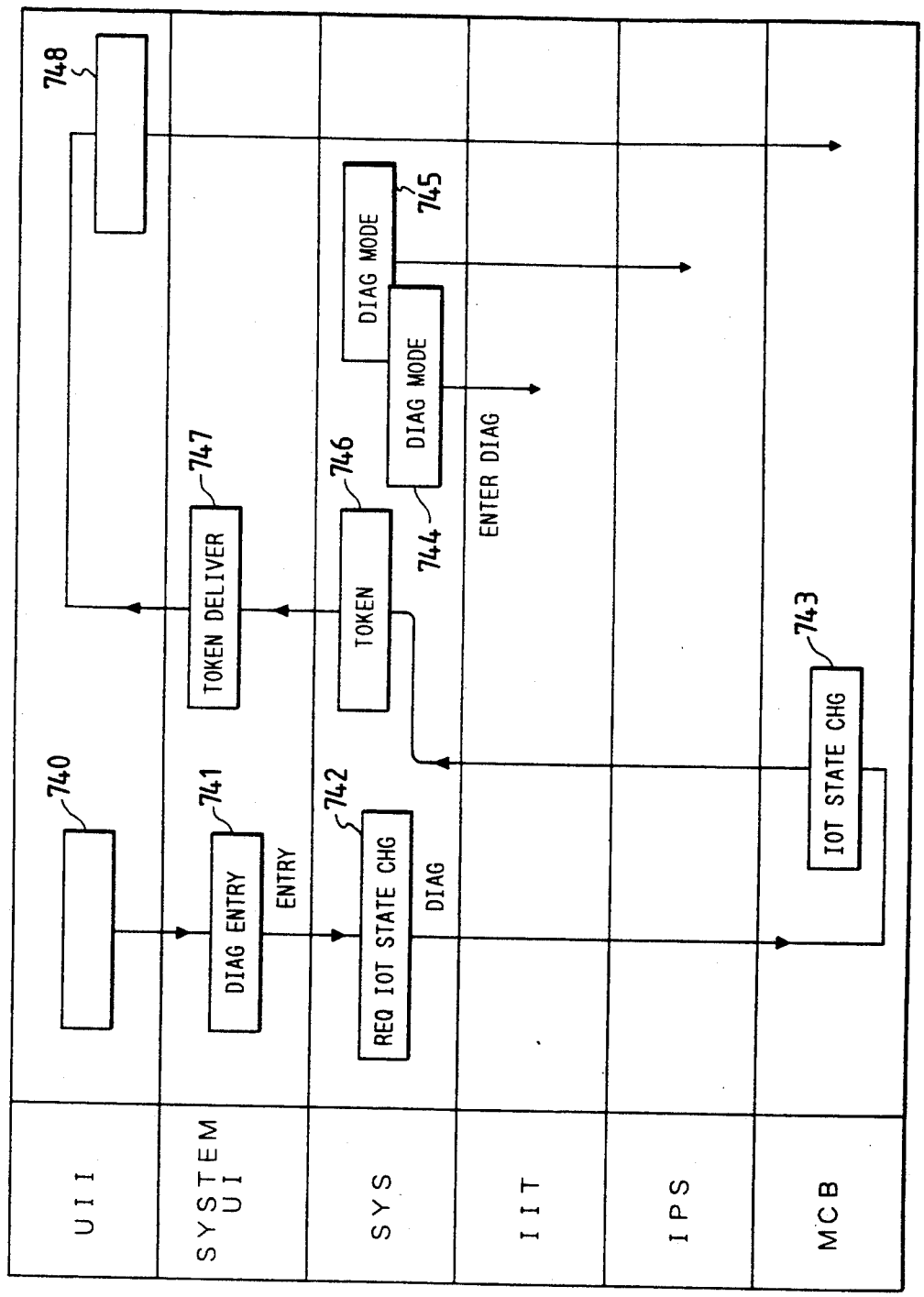
FIG. 10 is an interface correlation diagram showing an exemplary sequence of DIAG ENTRY.

When the machine is in the STAND BY state of the customer mode, which is a normal mode, it enters the DIAG state upon pressing a predetermined button at the UI. The flow of commands at this moment is as shown in FIG. 10. Specifically, upon pressing button 740 at the UI for DIAG ENTRY, SYSUI module 81 interprets the button data, judges that the machine is requested to enter the DIAG state, and sends SYSTEM module 82 a DIAG ENTRY command 741, a command indicating that the request has been accepted. In response to this command, SYSTEM module 82 directly sends the MCB a request IOT state change (REQ.IOT STATE CHG) command 742, requesting the IOT to change its state to the DIAG state. In response thereto, the MCB switches the state of the IOT from the customer mode to the diag. mode and sends SYSTEM module 82 an IOT state change (IOT STATE CHG) command 743 indicating that the IOT state has been switched to the diag. mode. SYSTEM module 82, in response thereto, informs both the IIT and IPS subsystems of the state change of the IOT to the diag. mode while sending them DIAG MODE commands 744, 745, respectively. SYSTEM module 82 also sends SYSTEM UI module 81 a TOKEN command 746. The token is a pass for giving and taking the UI master right, which is a right to monopolize the control of the UI. The UI master right is held by the SYS node in the customer mode, while it is held by the MCB node in the diag. mode. Thus, when the mode is changed from the customer to the diag. mode, processing for moving the UI master right is necessary. This processing is done by sending TOKEN command 746. SYSTEM UI module 81, upon reception of the TOKEN command from SYSTEM module 81, sends the UI subsystem a TOKEN DELIVER command 747, instructing the token to be delivered from the SYS node to the MCB node. Accordingly, the UI subsystem sends the MCB a predetermined command 748, thereby handing in the UI master right to the MCB node.

The above operation causes the machine to enter the DIAG state, and LLUI module 80 displays an initial screen of the diag. mode by an MCBUI module 86 instruction.

The above describes the procedure and operation when the service man intentionally causes the machine to enter the diag. mode. This copying machine thus offers mode change ease, dispensing with the trouble of turning the power supply on and off as is the case with the conventional machine. That is, the machine exits from the customer mode and enters the diag. mode upon interpreting the button operation and informing DIAG ENTRY to each subsystem. This operation is not only simple but also helpful in preventing mechanical deterioration and breakdown of the electric parts due to frequent on/off operation of the power supply, thereby improving machine reliability.

In the conventional DIAG ENTRY method requiring that the power supply be turned on and off, various data, particularly trouble data, written in the RAM is erased when the power supply is turned off, thereby limiting the diagnosis menu in the diag. mode. However, the DIAG ENTRY procedure of the invention, not requiring that the power supply be turned on and off, can increase the diagnostic items in the menu because the RAM data before entering the diag. mode remains unerased.

(B) Diag. Screen

A screen to be displayed on the UI when the machine enters the diag. mode through the above DIAG ENTRY procedure will be described.

Predetermined UI operations must be performed when the user or service man executes a fault check, refers to a fault history, and makes adjustments in the diag. mode. To allow the service action to be completed within a matter of 30 minutes, special considerations must be given to the UI screen design in the diag. mode. It is obvious that poor UI screens not only lead to time-consuming service action but also disadvantageously demand a certain degree of skill in the operation of the UI itself, while good UI screens which can guide the user for proper procedures offers ease and efficiency in service action. Thus, in this case, the screens prepared by category, such as fault check and adjustment, would be convenient.

Accordingly, this copying machine is so designed that the diag. mode screen (hereinafter referred to as "diag. screen") comes in several categories and that each category is switched by a passway.

Some of the diag. screens will be described below together with the screen change operation.

Figure 11A:
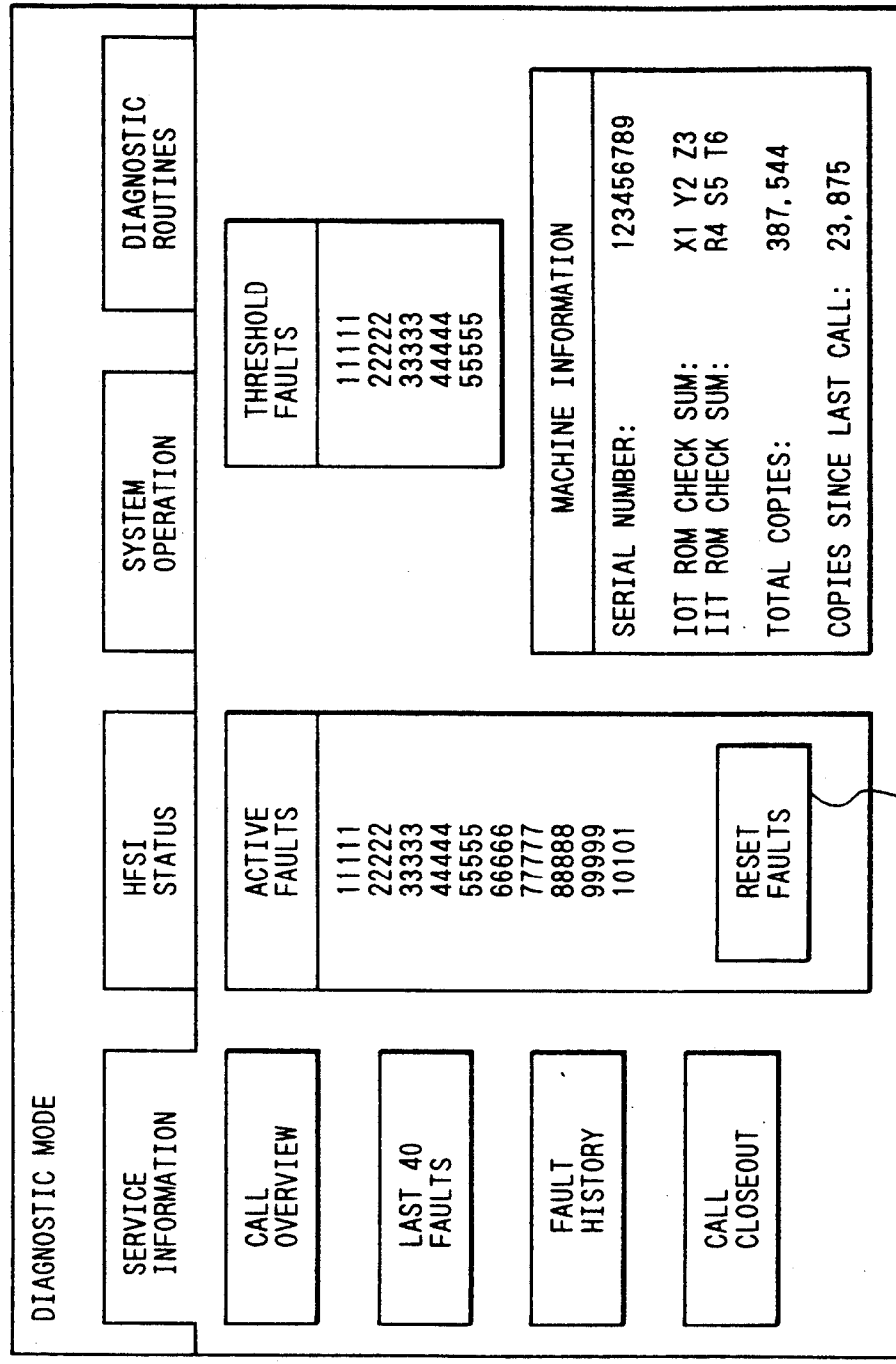
FIG. 11(a) to 11(h) are diagrams showing exemplary diag. screens.

Upon end of the processing shown in FIG. 10, a CALL OVERVIEW screen of a SERVICE INFORMATION passway shown in FIG. 11(a) is displayed. This is the first diag. screen. It is understood from this figure that the diag. mode is divided into four categories: SERVICE INFORMATION, HFSI STATUS (high frequency service item status), SYSTEM OPERATION, and DIAGNOSTIC ROUTINES.

1) SERVICE INFORMATION Passway

The SERVICE INFORMATION passway provides data relating to a fault detected by the auto fault check. This is the first screen to be displayed since the data provided is requisite to identify the cause of the fault.

This passway includes four options: CALL OVERVIEW, LAST 40 FAULTS, FAULT HISTORY, and CALL CLOSE OUT.

The CALL OVERVIEW is a screen for displaying the content of a fault that is present when the machine is down. Upon entrance to the diag. mode, this screen is displayed by default. This screen displays a maximum of 10 ACTIVE FAULTS, a maximum of 5 THRESHOLD FAULTS, and MACHINE INFORMATION indicating machine data such as the number of copies to be taken. In FIG. 11 (a), there are 10 ACTIVE FAULTS designated by code number 11111, . . . , 10101, allowing the service man to know what kind of fault the machine is currently suffering by referring to the fault code table. RESET FAULTS button 750 serves to delete the display in the ACTIVE FAULTS column.

Figure 11B:
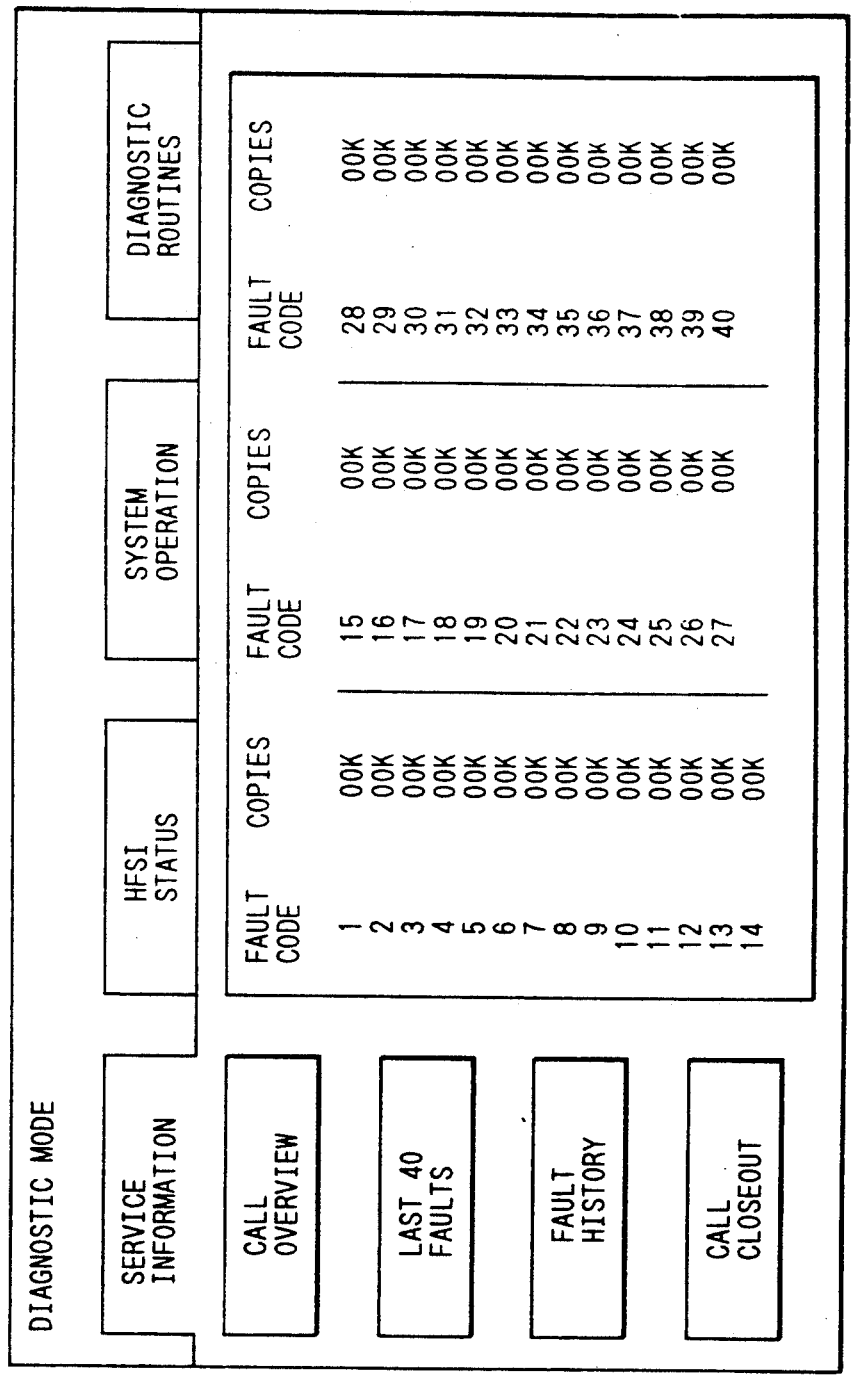

Upon pressing the LAST 40 FAULTS button in the screen of FIG. 10(a), the screen shown in FIG. 11(b) will be displayed, showing the last 40 faults in the order of occurrence by the code number.

Figure 11C:
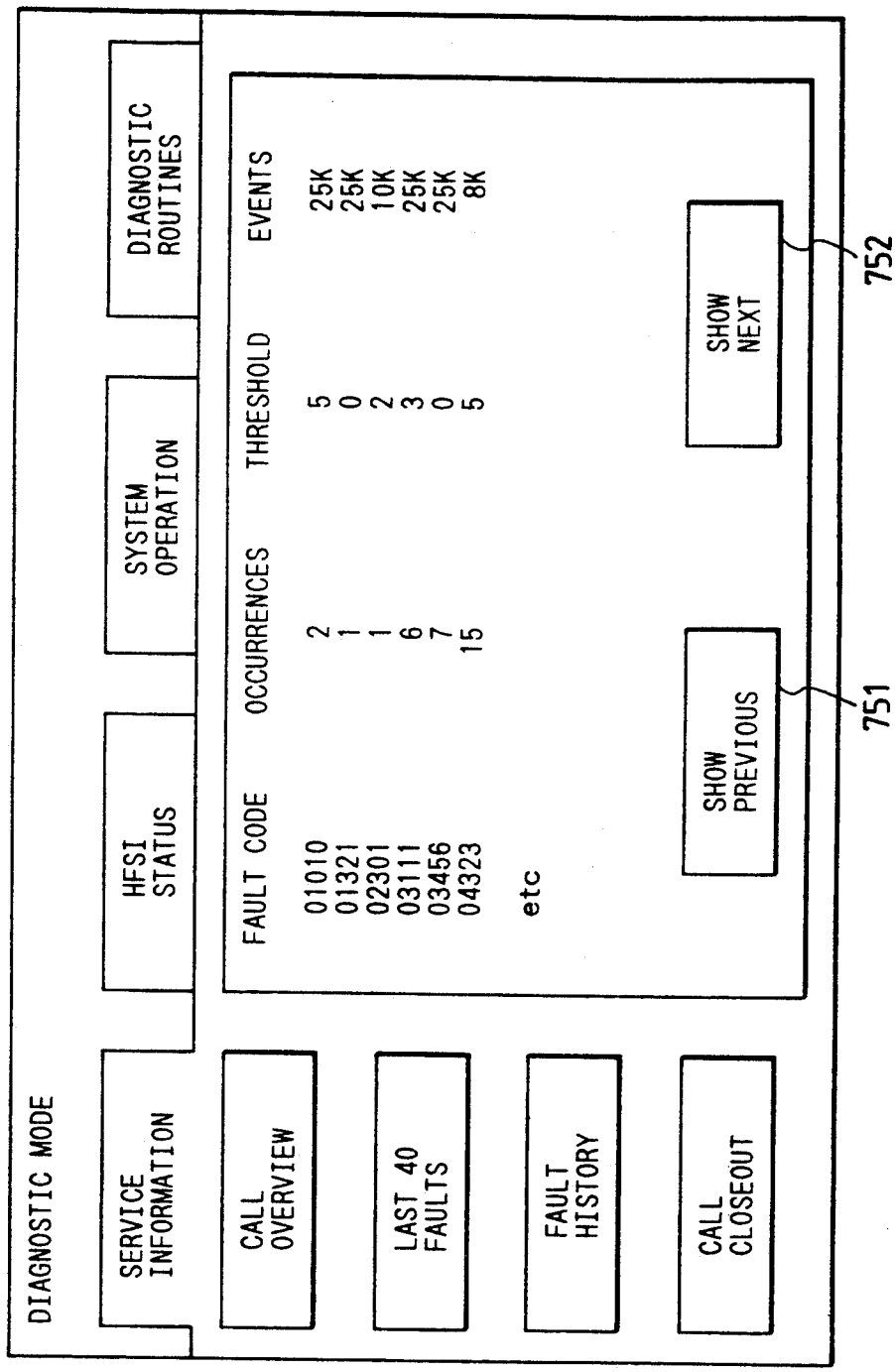

Upon pressing the FAULT HISTORY button in the screen of FIG. 11(a), the screen shown in FIG. 11(c) will be displayed. This screen displays the code of the faults (FAULT CODE) that occurred after the preceding service call, their occurrences (OCCURRENCES), their threshold values (THRESHOLD), and the mean time between faults (EVENTS). Form FIG. 11(c), it is understood that a fault whose code number is 01010 has occurred twice every 25 kCV (kilo copy volume). The THRESHOLD is a value for indicating the necessity for replacement of a part when the number of occurrences of a fault exceeds such threshold. SHOW PREVIOUS button 751 and SHOW NEXT button 752 are provided to change the page when the faults that occurred cannot be contained in a page.

Figure 11D:
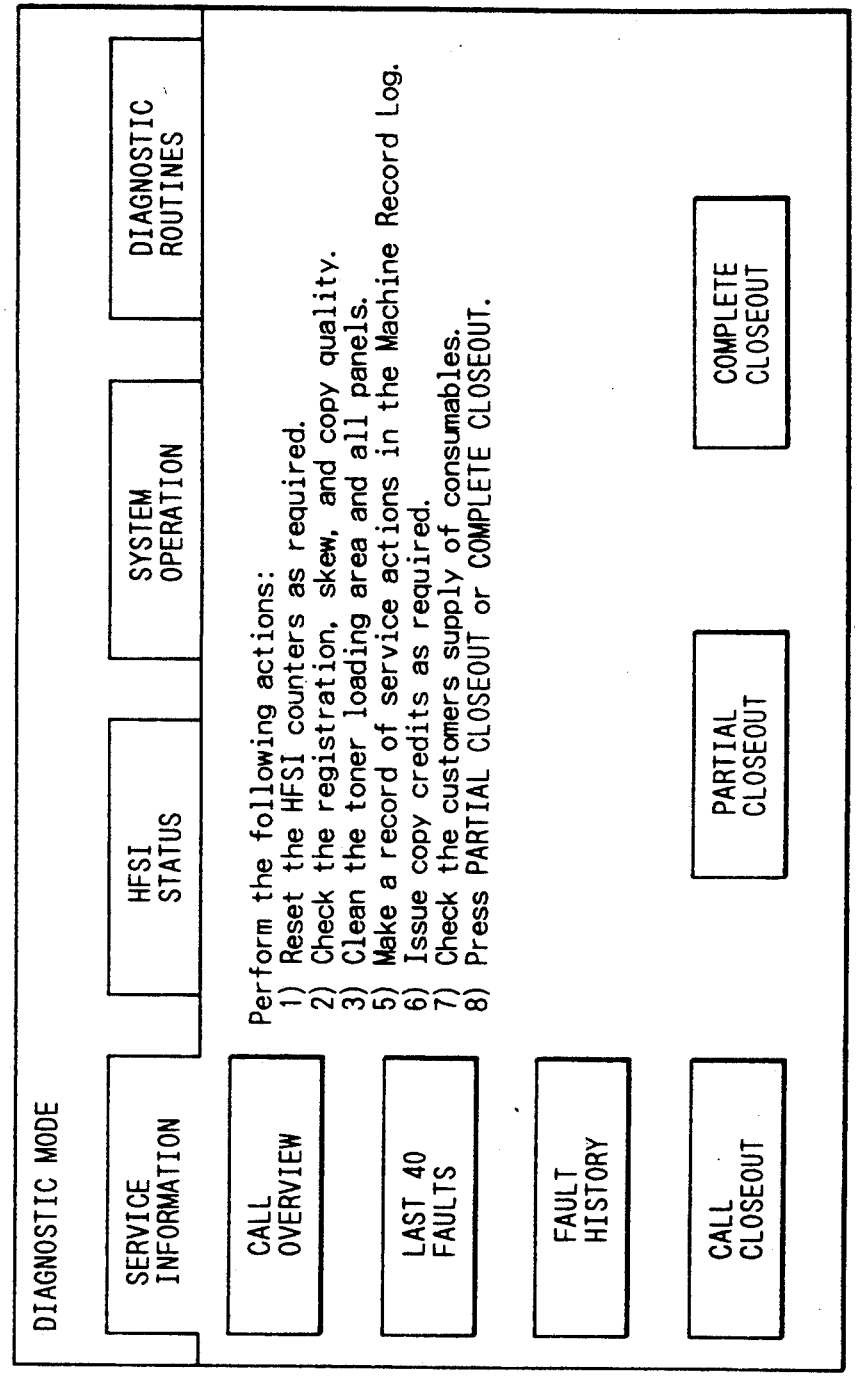

The CALL CLOSEOUT button is pressed to cause the machine to return to the customer mode, which is the normal copy mode, from the diag. mode when the service action has been through. For example, as shown in FIG. 11(d), the operation procedure will be displayed. The service man thus follows the procedure as displayed. He must no longer refer to a service manual.

2) HFSI STATUS Passway

Figure 11E:
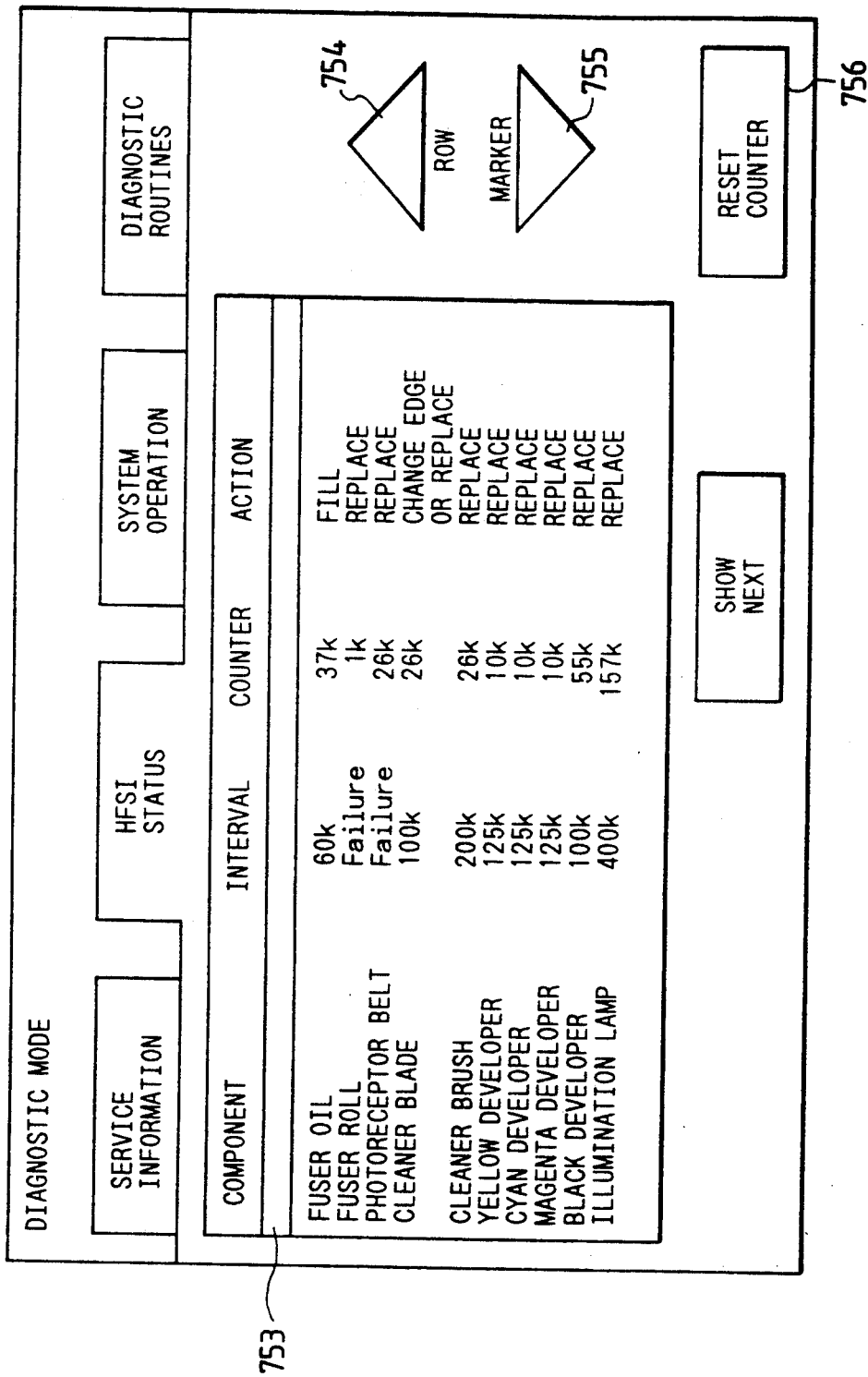

In the screens shown in FIGS. 11(a) to 11(d) having HFSI STATUS passway displayed, the screen shown in FIG. 11(e) will appear upon pressing the HFSI STATUS passway tab. This screen displays a component name (COMPONENT), its life (INTERVAL), operating time (COUNTER), and state (ACTION). According to FIG. 11(e), fuser oil has a life of 60 kilo hours and has consumed 37 kilo hours out of its life. The description under the heading "ACTION" being "FULL" means that the amount of the fuse oil is sufficient. This screen allows the service man to judge the replacement timing of each component. When the component has been replaced, the counter must be reset with scroll buttons 754, 755 for moving cursor 753 up and down. When cursor 753 is located at the replaced component by operating scroll button 754 or 755, reset counter button 756 is pressed to reset the counter. The SHOW NEXT button has a function similar to that of button 752 shown in FIG. 11(c).

3) SYSTEM OPERATION Passway

This passway is used in case of a diag. copy job for performing the copying operation in the diag. mode and can be selected by pressing a SYSTEM OPERATION passway tub. As described above, the diag. mode may, in some cases, require that some copies be made either to isolate a trouble or to confirm the result of various adjustments. The SYSTEM OPERATION passway is used in such a case. Functions available in this passway are a PREPROGRAMMED JOBS and a FEATURE FUNCTION PROGRAMMING. The PREPROGRAMMED JOBS allows the copy operation to be performed under a preset copy execution condition, while the FEATURE FUNCTION PROGRAMMING allows an arbitrary copy execution condition to be set in the same manner as in the case of the normal copy operation in the customer mode. The FEATURE FUNCTION PROGRAMMING is also called a CUSTOMER SIMULATION mode because of its analogy to the normal copy operation in the customer mode.

Figure 11F:
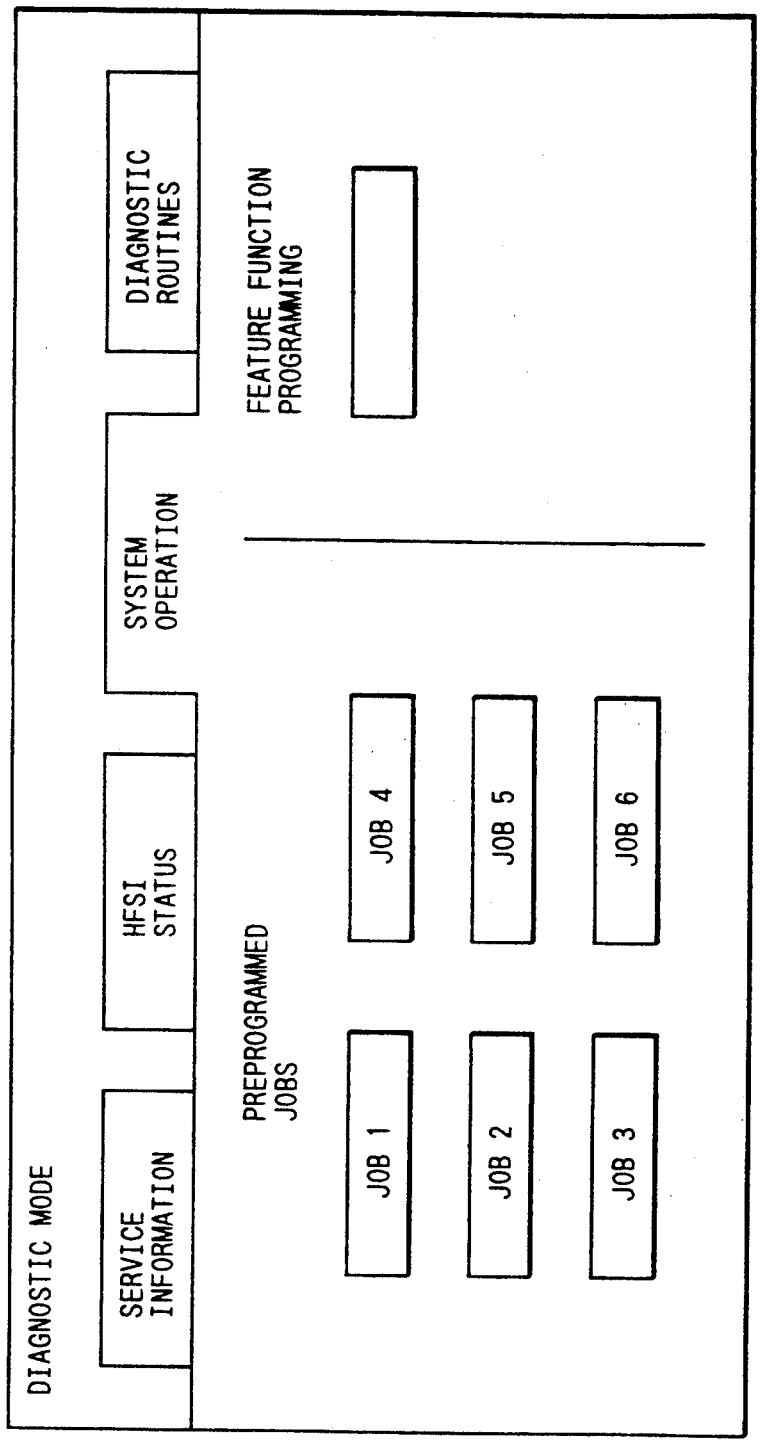

An exemplary SYSTEM OPERATION passway screen is shown in FIG. 11(f). In FIG. 11(f), six PREPROGRAMMED JOBS buttons and a FEATURE FUNCTION PROGRAMMING button are displayed. Any desired diag. copy job can be activated by pressing these buttons. These buttons will be described in more detail later.

4) DIAG ROUTINES Passway

Figure 11G:
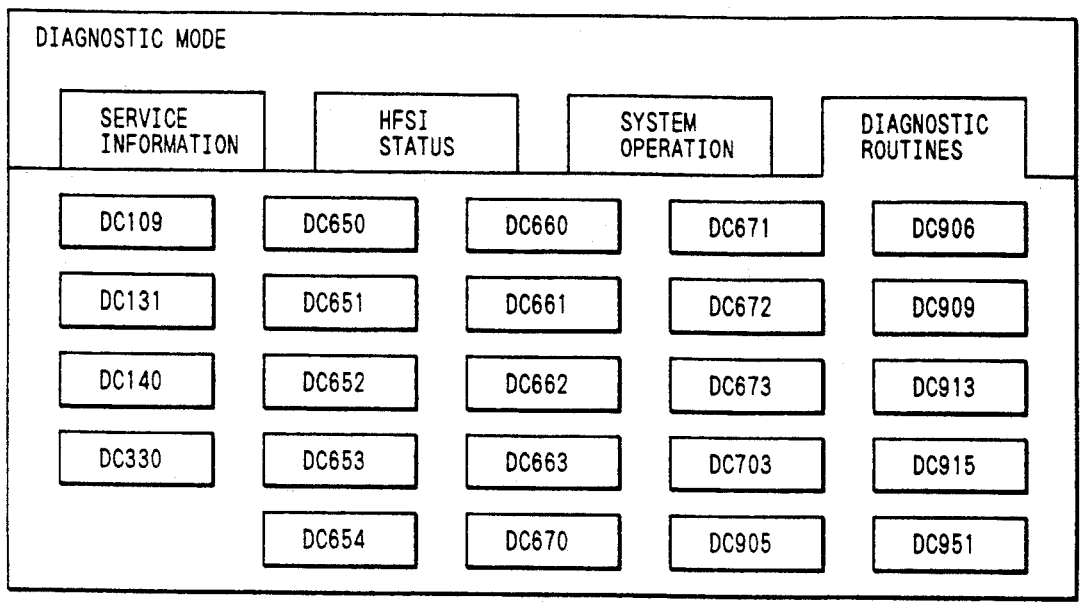
Figure 11H:
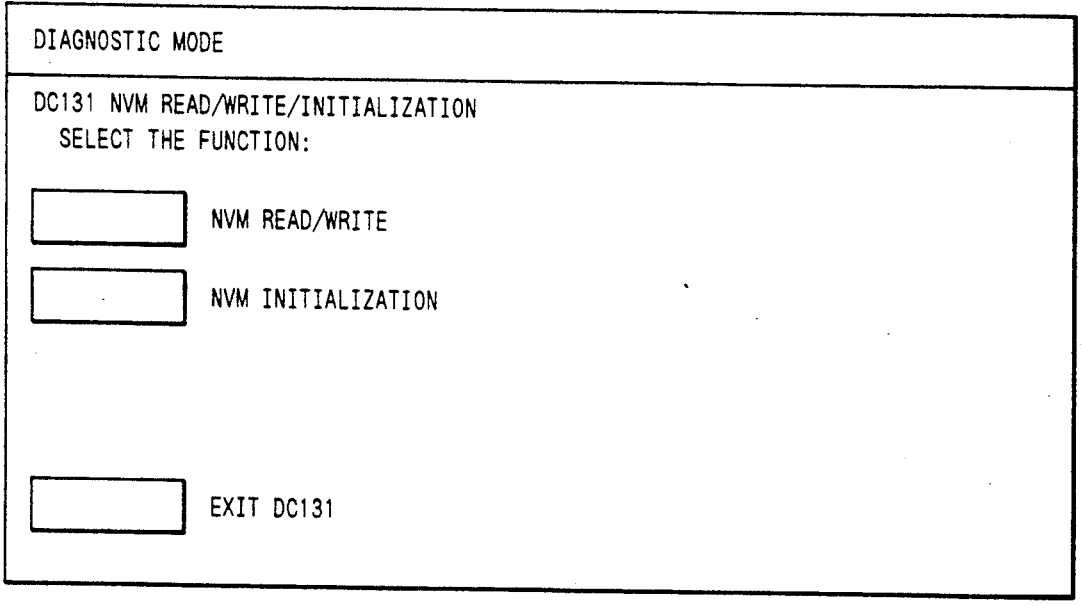

This passway is used to locate or adjust the part in trouble. An exemplary screen is shown in FIG. 11(g). In the DIAG ROUTINES passway screen a diag. code numbers (DC) are displayed. Upon pressing the DC number of a desired machine control or adjustment, a pop-up will appear to allow a desired process to be performed. For example, the button of a DC number DC131 is pressed to perform an NVM check. Then the pop-up shown in FIG. 11(h) will be displayed to allow the NVM read/write operation or initialization to be performed.

The above-described screens permit a desired operation to be performed easily, thereby contributing to shortening the period to terminate the service action.

(C) PREPROGRAMMED JOBS

This function is provided to isolate a trouble with a job preset to a predetermined subsystem. Jobs are specified by the check item. The jobs include a job for copying a video signal from a pattern generator (PG) on a predetermined number of sheets, e.g., 10 sheets fed from a tray and a job for copying an image from an original by reducing or enlarging it at a preset rate. These jobs can be selected by pressing the job buttons shown in FIG. 11(f). PREPROGRAMMED JOBS operation allows a trouble to be isolated and confirms that each subsystem functions properly. The proper function of the sheet forwarding path can be checked by copying while feeding a sheet from each tray; the production of a predetermined image from the PG indicates that the post-PG processes are functioning properly. The proper operation of the reduction/enlarging function can be checked by copying an image in reduced or enlarged form.

Figure 12A:
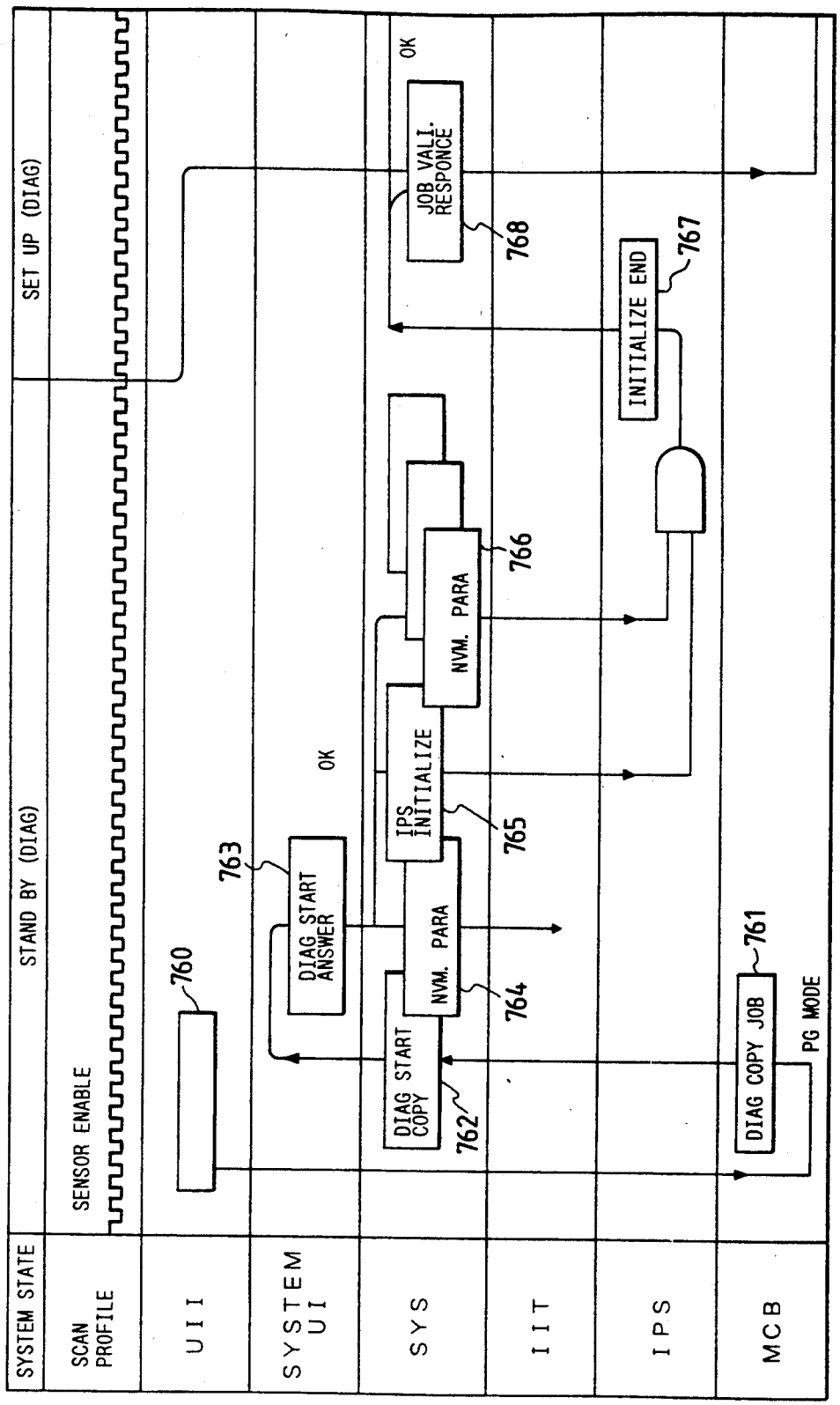
Figure 12B:
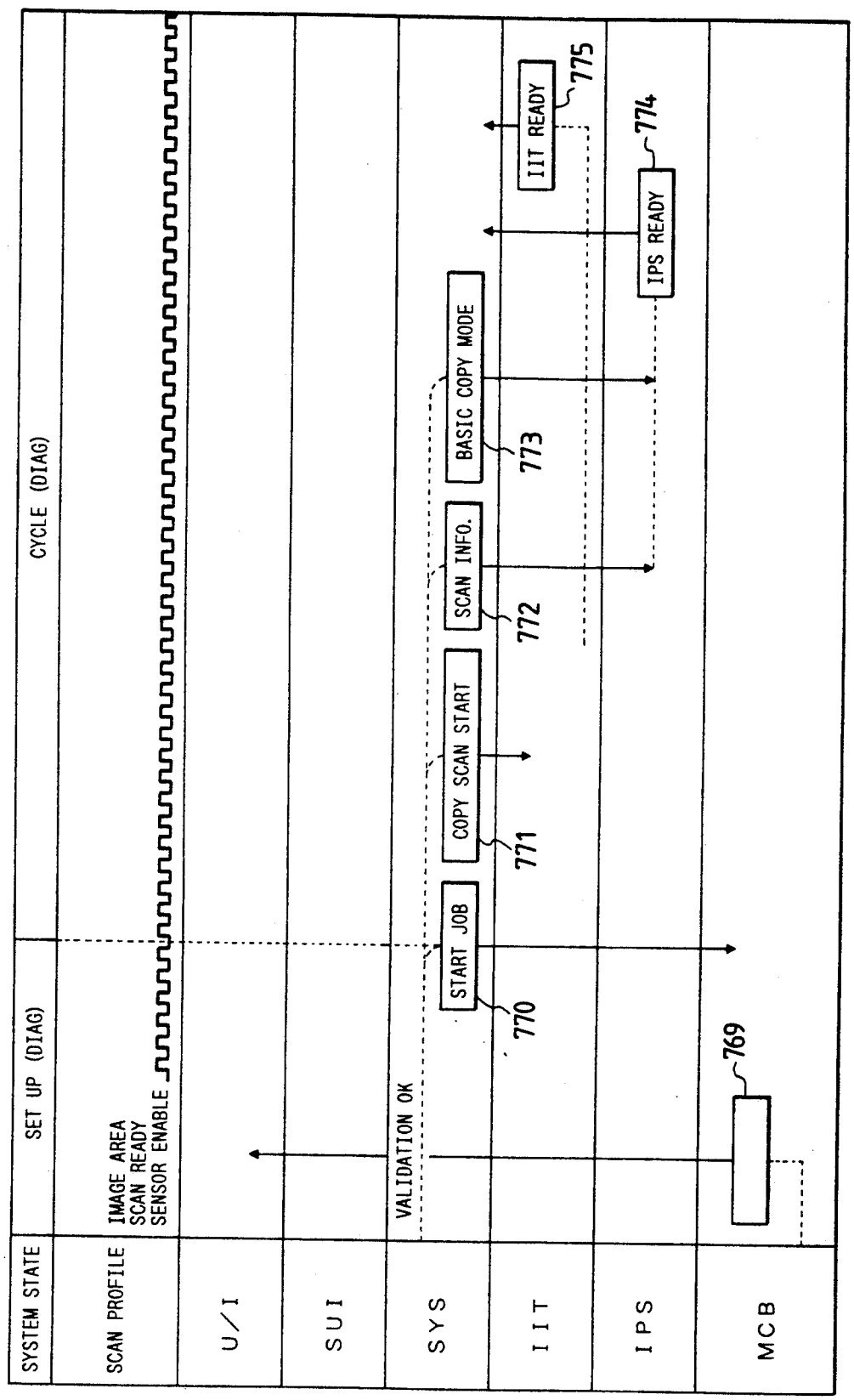

The PG copy operation will be described now with reference to the interface correlation diagram in the PG copy mode shown in FIGS. 12(a) to 12(g).

Where the PG is located will be described first. The PG is used as a means for identifying which circuit board or subsystem is in trouble. There are four PGs arranged as shown in FIG. 12(g). IIT 3 includes: an IU 920 having a CCD line sensor mounted thereon; an analog board 921 having a circuit for digitizing analog video signals outputted from the CCD line sensor; and a digital board 922 having a circuit for performing separation/synthesis and shading correction processes for digitized point-sequential color video signals on a color component basis. Analog board 921 has PG1 930 mounted and can switch its input signals from the CCD line sensor output to the PG1 930 output by setting switch 940 disposed at its output to the PG1 930 position. Digital board 922 has two PGs, PG2 931 and PG3 932. PG2 931 and PG3 932 can supply their outputs to the succeeding circuits by setting switches 941, 942 disposed at the input and output of digital board 922 to their positions, respectively. IOT 5 has PG4 933 and can supply PG4 933 output signals through switch 943 disposed at its input.

In the above configuration, let it be supposed, e.g., that the copy operation is started with switch 943 set to the PG4 933 position. Upon changeover of the signal line, IOT 5 receives a predetermined video signal electrically generated by PG4 933. As long as a predetermined pattern can be obtained from PG4 933 as a copy output, it is verified that IOT 5 is sound and it is the signal line prior to IOT 5 that is defective. Other PGs can be checked similarly. It goes without saying that the use of these PGs permits trouble isolation; i.e., the board in trouble can be identified.

Upon end of the flow shown in FIG. 10, the machine is in the DIAG STAND BY state, i.e., the STAND BY state in the diag. mode. Under this state the screen shown in FIG. 11(f) is called by a button operation; to perform the copy operation with PG4 933, a button for copying with PG4 933, e.g., "JOB 1" button must be selected; and then the start button is pressed. Thereafter, as shown in FIG. 12(a), these button data 760 is directly sent from the UI subsystem to the MCB subsystem. Normally, the button data from the UI subsystem is sent to the SYS subsystem through the SYSUI. In the diag. mode, since it is the MCB mode that holds the UI master right, the button data is sent to the MCB subsystem. The MCB subsystem, in response to button data 760, recognizes that the PG copy has been supported, sends the SYS subsystem the parameters indicating that the PG copy job has been selected, together with a DIAG COPY JOB command 761. The SYS subsystem, receiving command 761 sends the SYSUI a DIAG START COPY command 762 to request a VALIDATION CHECK, i.e., to ask if the machine is ready to start copying. The SYSUI executes the check and if it finds that the machine is ready to copy, it sends the SYS a DIAG START ANSWER command 763. This causes the SYS to send an NVM parameter 764 to the IIT subsystem and an IPS INITIALIZE command 765 to the IPS subsystem to initialize the PG copy mode, and an NVM parameter 766 successively. As described above, the PG copy job is a function for supplying video signals from the PG to the IOT, and thus the signal lines of the IIT subsystem and the IPS subsystem are separated from each other. However, the IIT and IPS subsystems are designed to perform the copy operation in a manner similar to the normal copy operation. For this reason, the normal copy operation is available in the diag. copy job.

The IPS subsystem, upon end of its initialization and reception of the parameters, sends the SYS an INITIALIZE END command 767. In response thereto, the SYS recognizes that the IPS subsystem has completed its initialization and parameter reception, causing the machine to proceed from the STAND BY state to the SETUP state in the diag. mode.

Upon entering the SETUP state in the diag. mode, the SYS informs the MCB subsystem of its recognition that the job has been confirmed with a job validation response (JOB VALI. RESPONSE) command 768. The MCB subsystem, having received this command, sends the UI subsystem a predetermined command 769 shown in FIG. 12(b), causing the UI subsystem to display a predetermined message.

Upon display of the message, the machine enters the DIAG CYCLE state from the DIAG SETUP state.

To activate each subsystem in the DIAG CYCLE state, the SYS sends the MCB subsystem such parameters as the number of copies, color mode, sheet size, together with a START JOB command 770 and the IIT subsystem such parameters as the scan length, reduction/enlarging rate, and register position, together with a COPY SCAN START command 771. This causes the IIT subsystem to light up an exposure lamp. The SYS sends the IPS subsystem the scan type parameter, together with a scan information (SCAN INFO.) command 772, and such parameters as the sheet size, sheet type, the reduction/enlarging rate and amount of movement in the main scan direction, the reduction/enlarging rate and amount of movement in the SS direction, color mode, image quality data, and no editing data, together with a BASIC COPY MODE command 773. Upon specification of these parameters, both the IIT and IPS subsystems send the SYS an IIT READY command 775 and an IPS READY command 774, respectively. As a result, the SYS is informed that the IPS subsystem has completed its preparation. It goes without saying that the parameters sent from the SYS have already been specified for the PG copy mode.

Figure 12C:
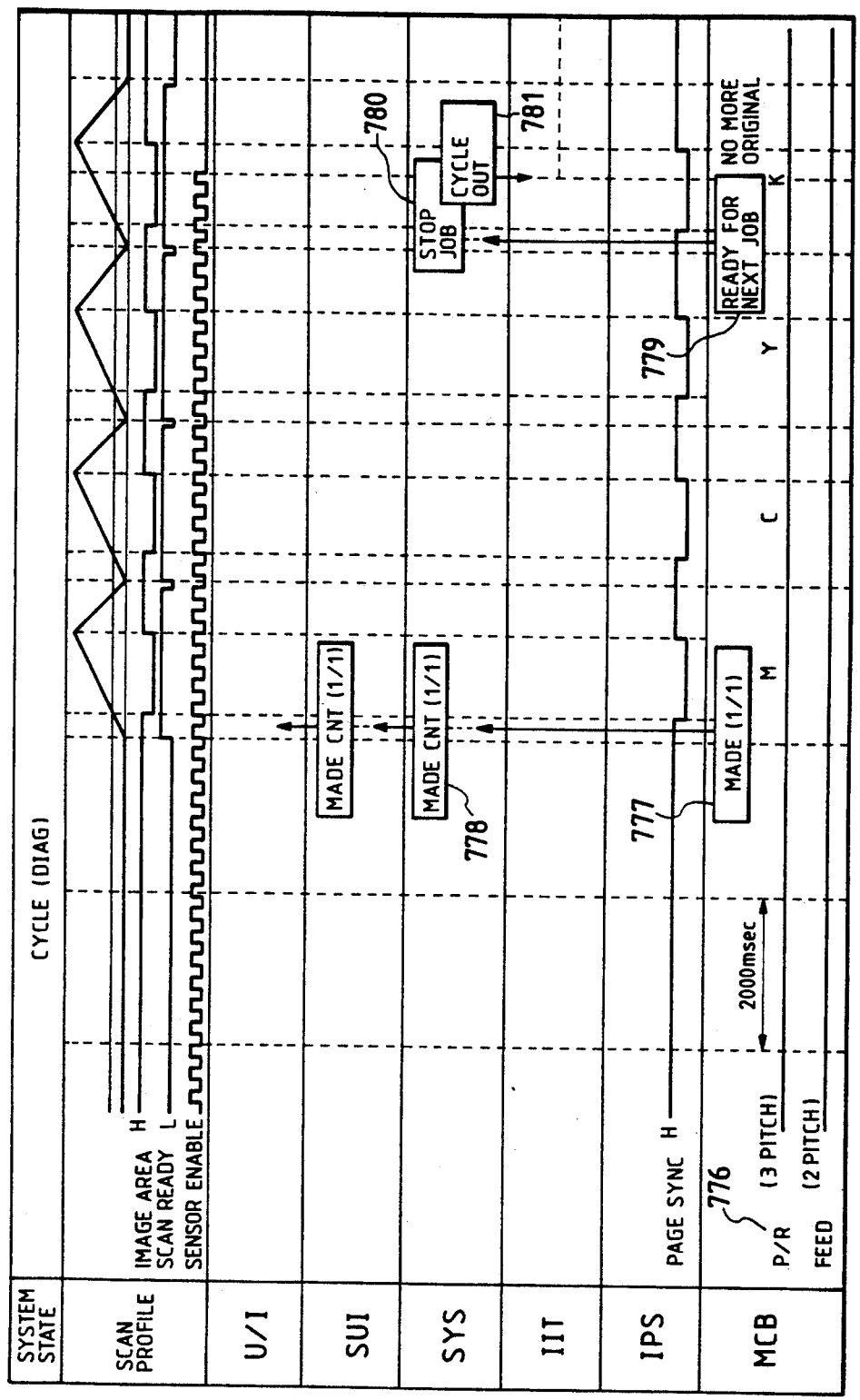
Figure 12D:
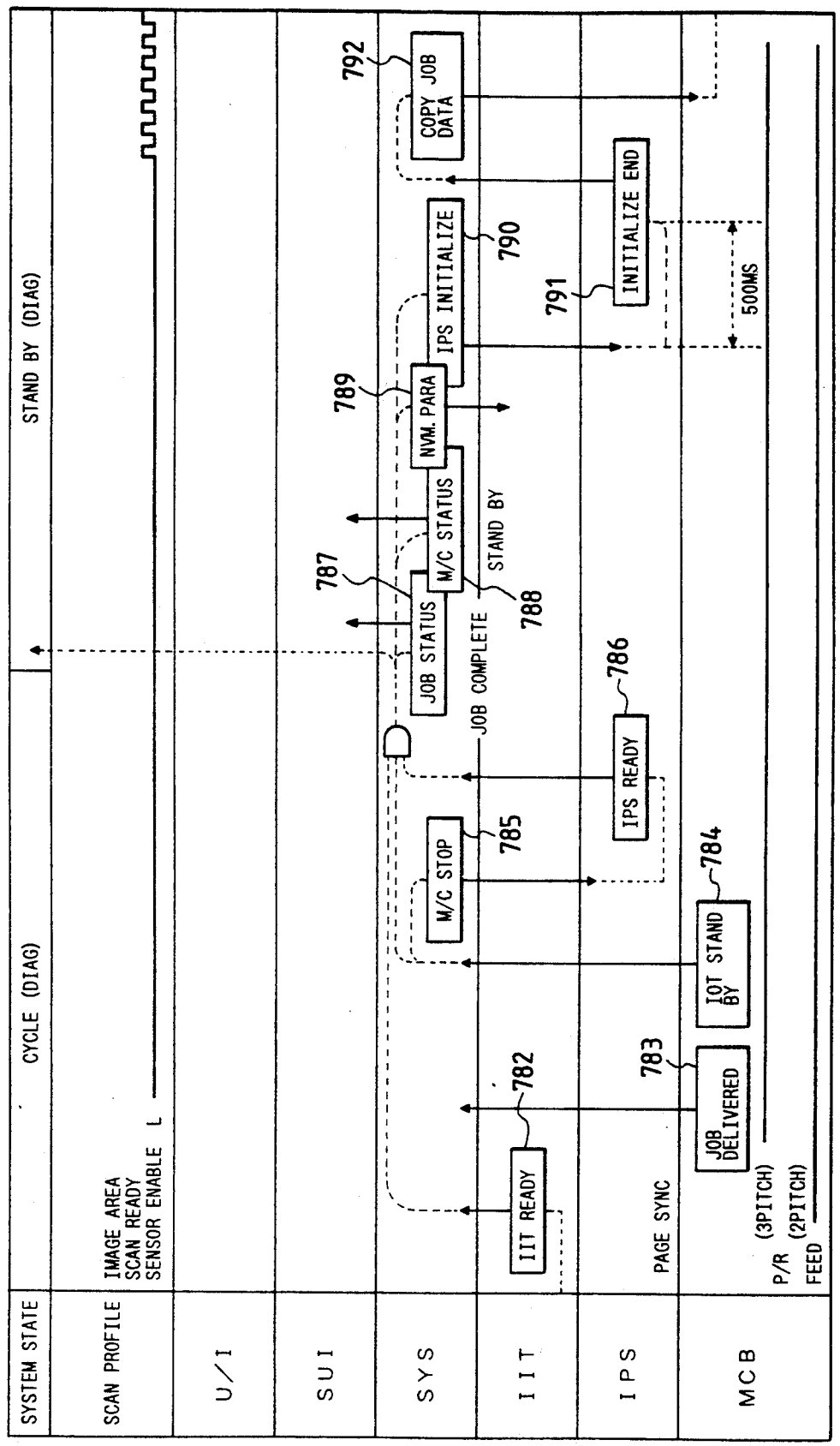
Figure 12G:
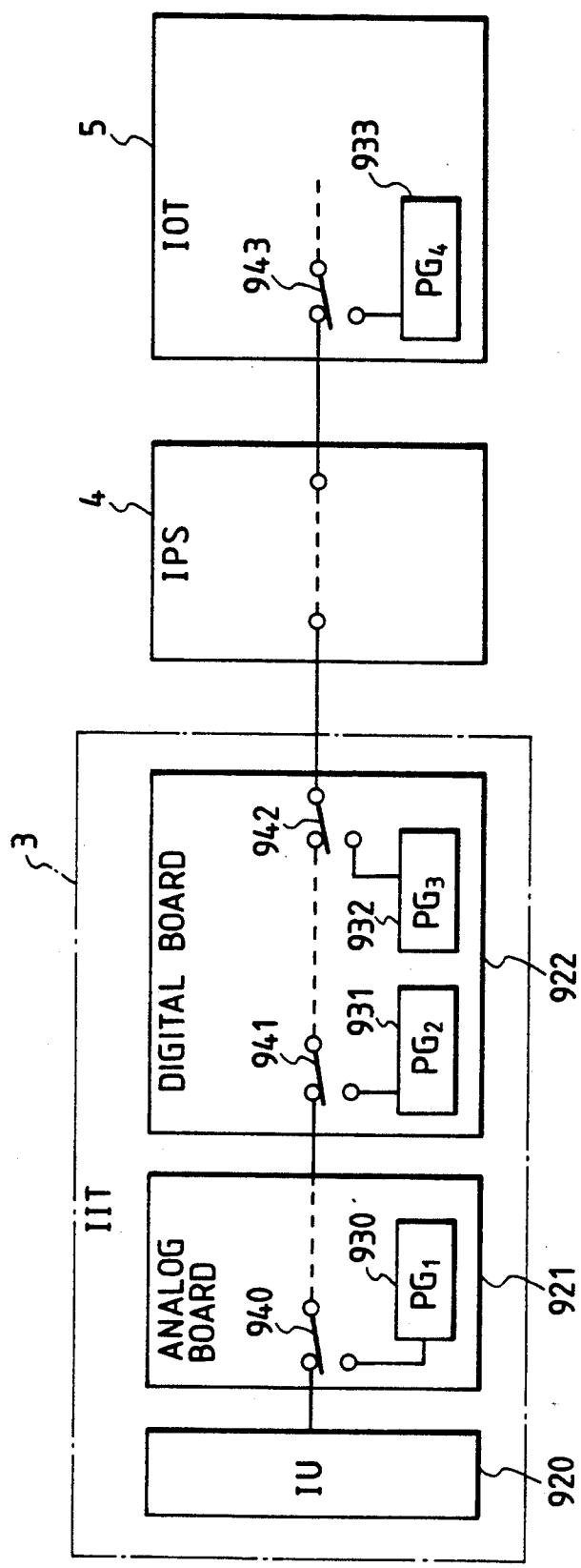

As each subsystem gets ready, the MCB subsystem sends PR signal 776 as shown in FIG. 12(c), and with this signal as a trigger, the IU starts scanning. Upon start of a first development cycle of the copy operation, the MCB sends the SYS an MADE command 777, informing the latter of the start of the development processing. The SYS, upon reception of MADE command 777, prepares a made count (MADE CNT) command 778 and sends it to the UI subsystem through the SYSUI. As a result, the color CRT displays the copy count. As described so far, while the UI master right is held by the MCB node in the diag. mode, the copy count is managed by the per-original layer, and the per-original layer, being an operation performed by the SYS node, the copy count is sent from the SYS to the UI subsystem through the SYSUI.

Now a predetermined number of development cycles are executed. At the start of the last development cycle, which is a development cycle for color component K (black) of the four full-color development, the MCB subsystem sends the SYS a READY FOR NEXT JOB command 779, informing that the instructed job has been ended and a next job is awaited. In response thereto, if there is a next job, the SYS sends a command for that next job. Since there is no such job in this case, the SYS sends the MCB subsystem a STOP JOB command 780, instructing the MCB to stop its operation. The SYS also sends the IIT subsystem a CYCLE OUT command 781. As a result, the IIT subsystem puts out the exposure lamp upon end of the last scan and after the IIT operation has been put to a halt, returns an IIT READY command 782 shown in FIG. 12(d) to the SYS. The MCB subsystem informs the SYS with a JOB DELIVERED command 783 that a sheet has been discharged for the job and with an IOT STAND BY command 784 that the MCB has stopped.

The SYS, upon reception of IOT STAND BY command 784, sends the IPS subsystem a M/C STOP command 785, causing the IPS subsystem to stop. The IPS subsystem, upon end of its stopping operation, returns an IPS READY command 786 to the SYS.

When the IIT the IOT, and the IPS are all in the READY state, the machine proceeds from the DIAG CYCLE state to the DIAG STAND BY state.

Upon entering the DIAG STAND BY state, the SYS sends the SYSUI a JOB STATUS command 787 and a M/C STATUS command 788, informing that the PG copy job has been completed. The SYS further sends an NVM parameter 789 to the IPS subsystem, causing the IPS subsystem to be initialized. The transmission of the NVM parameter to the IIT subsystem and the initialization of the IPS subsystem serve to wind up the PG copy mode, and thus this is an operation specific to the copy job in the diag. mode.

Upon end of the initialization, the IPS subsystem returns an INITIALIZE END command 791 to the SYS. The SYS, having received the command 791, informs the MCB subsystem whether or not various synchronizing signals such as PR, IOT LS, IOT PS, IOT BYTE CLOCK, IIT LS, IIT PS, IIT VIDEO CLOCK, and LE@REG have been generated by a COPY JOB DATA command 792. Since these synchronizing signals are requisite in causing the respective subsystems to be in synchronism with each other to perform the copy operation, the SYS must detect the generation of all these synchronizing signals for the copy operation in the diag. mode and it must inform the MCB subsystem of the result of the detection upon completion of the copy operation.

The MCB refers to the copy job data and, as shown in FIG. 12(e), and directly informs the UI subsystem of the result by a predetermined command 793, causing the UI subsystem to display the result. An exemplary screen of such display is shown in FIG. 12(f). The screen in FIG. 12(f) displays 14 synchronizing signals with their generation check results. If it is found through the check that a signal has been generated, "GOOD" is displayed and if not, "NO GOOD" is displayed. With this screen displayed, the PG copy mode is terminated.

Accordingly, the defective part in the machine can be identified by referring to both the PG copy itself and the screen indicating the generation of the synchronizing signals, thus contributing to completing the service action within a short period of time.

The PREPROGRAMMED JOBS function has been described with an example of the PG copy mode using PG4 933. The PREPROGRAMMED JOBS function is similarly performed with other PGs. PREPROGRAMMED JOBS other than the PG copy, e.g., a job with reduction/enlarging rate specified, or a job with the color mode specified, can be performed similarly.

(D) FEATURE FUNCTION PROGRAMMING

This mode allows a desired copy execution condition (feature function) to be specified optionally. Since it is not distinguished from the customer mode, which is a normal copy mode, it is also called "customer simulation mode."

In the screen shown in FIG. 11(f), the machine enters the customer simulation mode upon pressing a FEATURE FUNCTION PROGRAMMING button. As a result, the color CRT displays a picture of a prescribed format. However, the background color of the screen is specified to a color different from that in the customer mode so as to identify that it is in the customer simulation mode that the machine stays. In addition, the billing is prohibited in this customer simulation mode. Since the customer simulation mode is used to check the result of the trouble isolation and adjustment, billing is not necessary. Thus, the customer simulation mode differs from the customer mode only in these two points, and the copy execution condition can be specified similarly. Thus, the customer simulation mode is employed if the user wishes to copy under a copy execution condition other than that specified in the above-described PREPROGRAMMED JOBS. Let it be supposed, e.g., that sheets whose number exceeds a threshold are jammed along the sheet forward path of a tray. To have a couple of sheets forwarded from that tray on a trial run basis, the customer simulation mode is used. This mode is also available to copy for a check of the result of various adjustments including electrostatic latent image erasure timing adjustment.

While the conventional copying machine cannot copy in the diag. mode, the copying machine according to the invention can copy in the diag. mode in exactly the same manner as in the customer mode with the feature functions. Thus, the copying machine of the invention offers an easy machine operation check as well as a proper machine setup.

The relationship between the customer simulation mode and the customer mode will be described with reference to FIG. 13.

Figure 13:
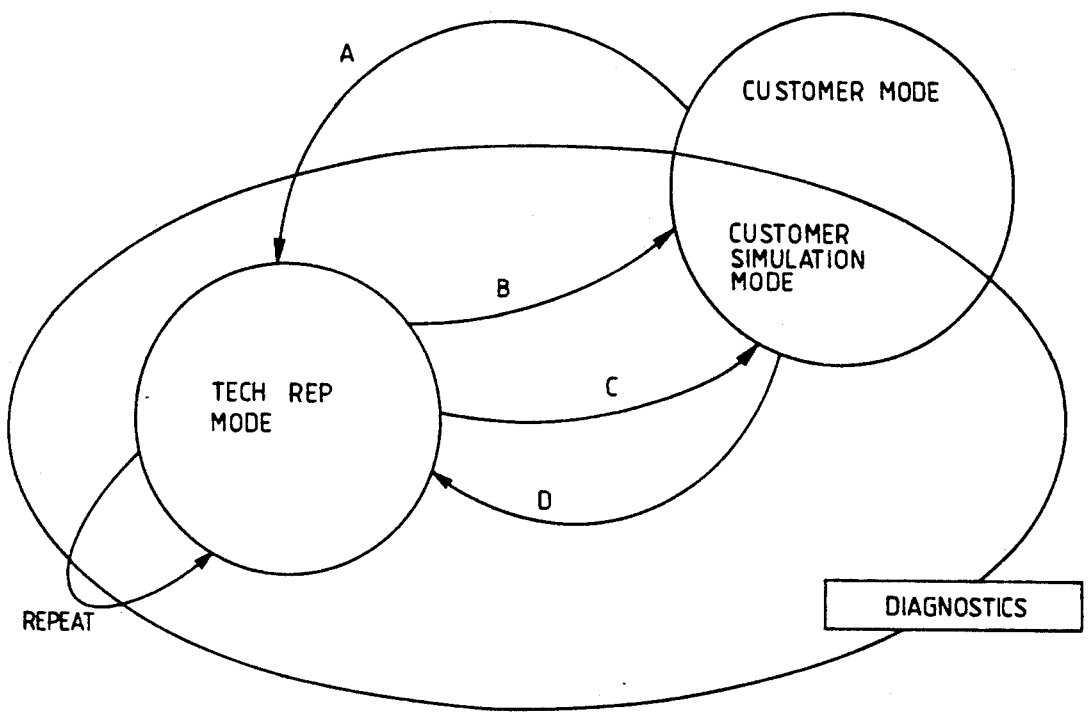
FIG. 13 is a diagram illustrative of the concept of a diagnostics.

FIG. 13 is a diagram showing the concept of the DIAG state of this copying machine. There are two modes: a TECH REP mode and the customer simulation mode. The TECH REP mode performs the I/0 check of components, various parameter specification, various mode specification, NVM initialization, and the like to help the service man diagnose or adjust the machine. The PREPROGRAMMED JOBS function is included in the TECH REP mode. On the other hand, the customer simulation mode is used to perform the customer mode, i.e., the normal copy mode, in the DIAG state. In FIG. 13, the customer mode partially overlaps the diag. mode, and it is this overlap that means that the customer mode is used in the DIAG state; i.e., the true meaning of the customer simulation mode. In FIG. 13, reference characters A, B, C, D designate button operations. Button operation A causes the customer mode to be changed to the TECH REP mode, and button operation B then causes the customer simulation mode to be activated. The same will apply to button operations C, D.

(E) DIAG EXIT

Figure 14:
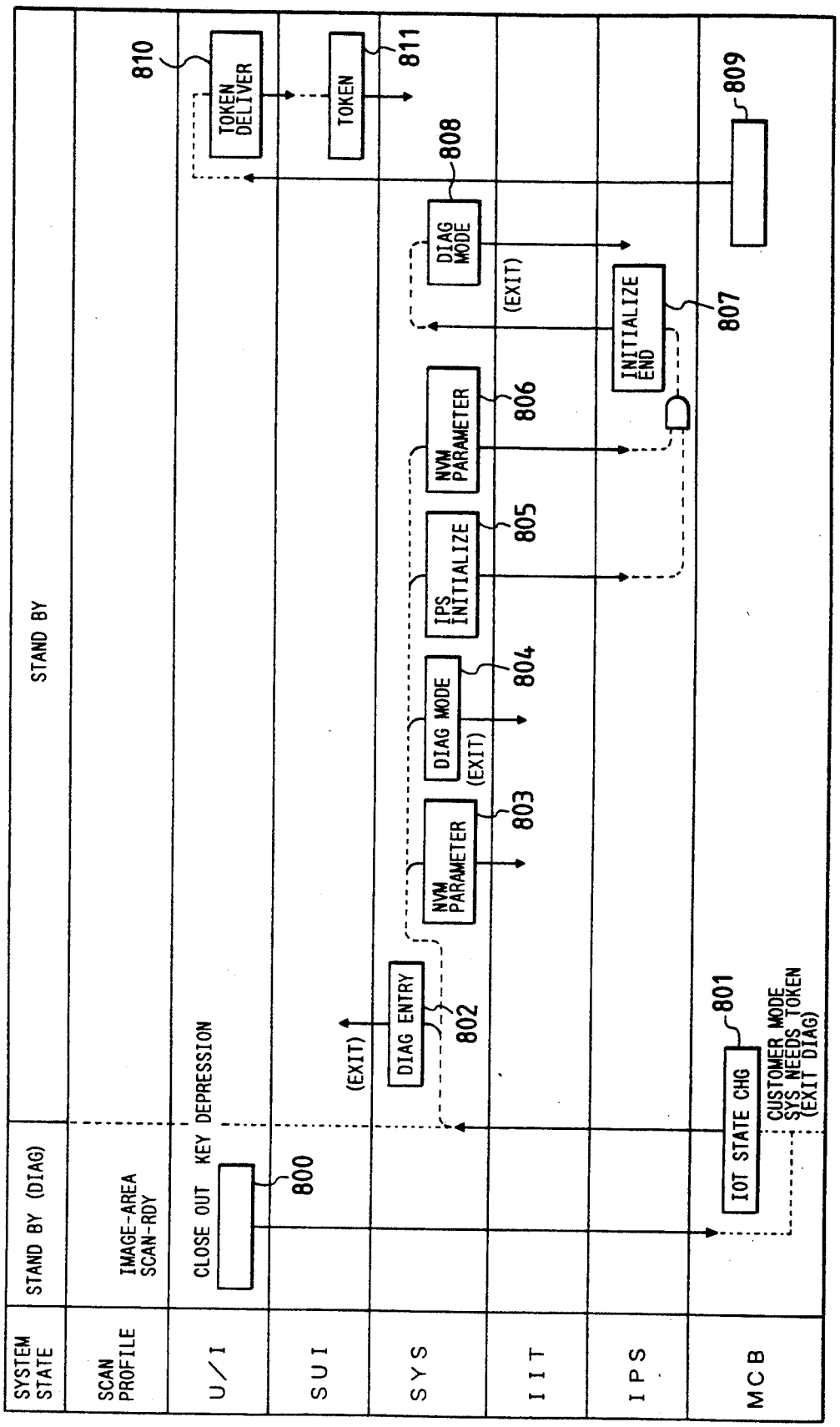
FIG. 14 is an interface correlation diagram showing an exemplary sequence of DIAG EXIT.

Once it has been confirmed that the machine has been set up properly with all the troubles eliminated with the above-described diag. copy job and other diag. functions, the machine must be returned to the customer mode. The operation required for this is the DIAG EXIT, which causes the machine to exit the diag. mode and return to the customer mode by pressing the CALL CLOSE OUT button in the SERVICE INFORMATION passway. This operation will be described with reference to the interface correlation diagram shown in FIG. 14.

When a COMPLETE CLOSE OUT button is pressed in the screen shown in FIG. 11(d), the UI subsystem informs the MCB subsystem holding the UI master right of the button data 800. Having received such data, the MCB subsystem executes DIAG EXIT, or terminates the diag. mode, and informs the SYS that the machine will enter the customer mode by an IOT STATE CHG command 801. Upon reception of the command 801, the machine state is switched from the DIAG STAND BY state to the normal STAND BY state.

The SYS, upon reception of IOT STATE CHG command 801, instructs the SYSUI to execute DIAG EXIT by an DIAG ENTRY command 802 in order to inform each subsystem that the machine will return to the customer mode. The SYS sends the IIT remote an NVM parameter 803, instructing DIAG EXIT to be executed by a DIAG MODE command 804. The SYS also initializes the IPS subsystem by an IPS INITIALIZE command 805 and sends the IPS subsystem an NVM parameter 806. Upon reception of an IPS INITIALIZE END command 807 from the IPS subsystem, the SYS instructs it to execute DIAG EXIT by a DIAG MODE command 808. The NVM parameters to be sent to the IIT and the IPS include all the parameters used in the customer mode. In view of some parameters which have been modified during adjustments in the diag. mode, all the parameters must be sent and updated when the machine state has been switched from the diag. mode to the customer mode.

When each subsystem has exited from the diag. mode in this way, the MCB subsystem sends the UI a predetermined command 809. As a result, the UI sends the SYSUI a TOKEN DELIVERY command 810 to hand the UI master right from the MCB node to the SYS node. The SYSUI, in response thereto, sends the SYS a TOKEN command 811, not only passing the UI master right to the SYS node, but also bringing to an end the operation of changing the mode from the diag. mode to the customer mode.

As described above, what is required to exit from the diag. mode is to merely press the button on the hard control panel. Thus, the invention not only offers simple procedures but also prevents failure and deterioration of the electric components due to frequent activation of the power supply or reduction in their reliability.

(F) POWER ON DIAG

The above is the operation to switch the machine from the customer mode to the diag. mode. The operation of automatically entering the diag. mode upon turning on the power supply will be described next.

FIGS. 15(a) to 15(g) are interface correlation diagrams showing the operation of each subsystem from the time the machine automatically enters the diag. mode upon turning on the power supply to the time the message "Machine is ready to copy" is displayed.

Figure 15A:
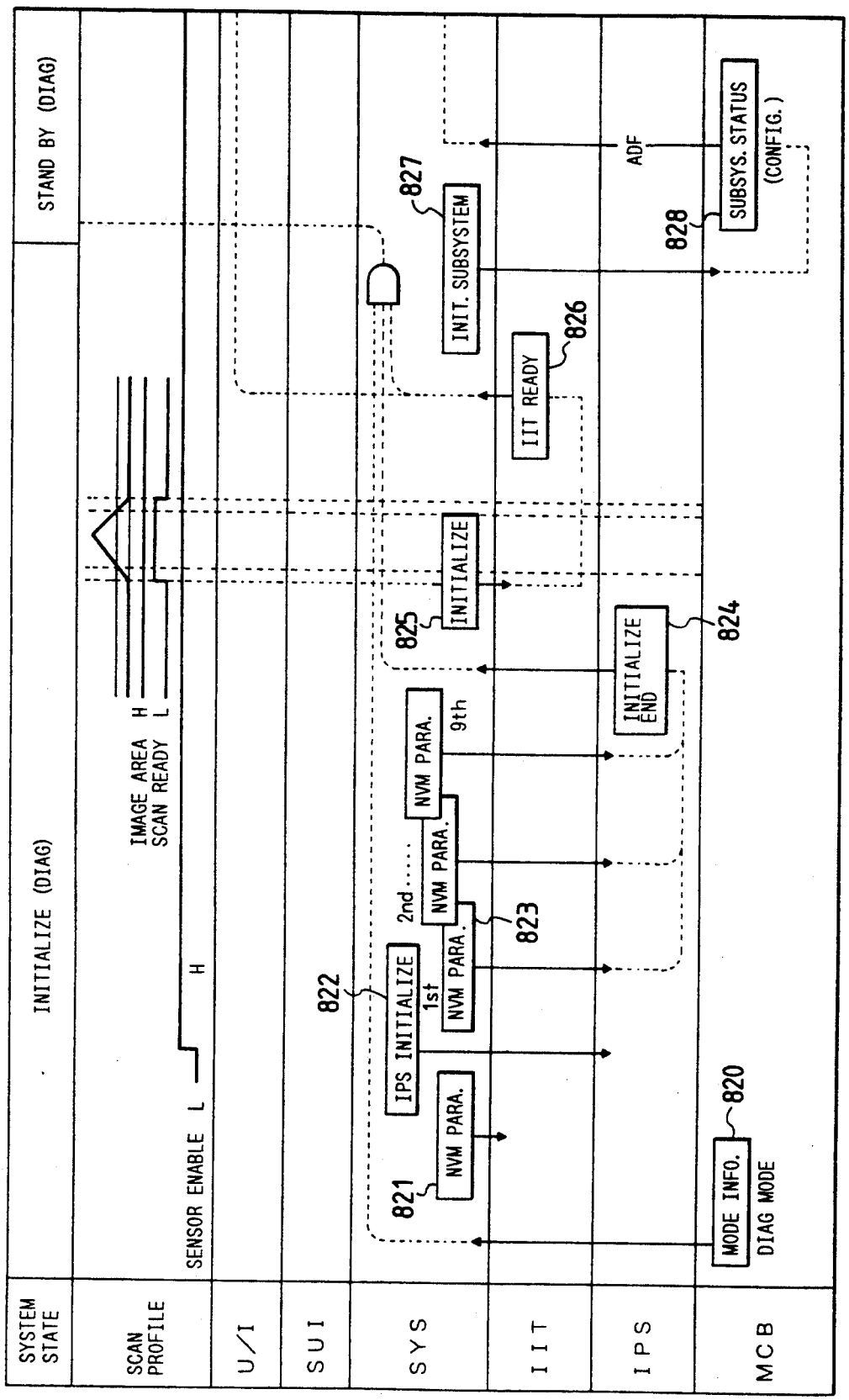
FIGS. 15(a) to 15(g) are interface correlation diagrams showing exemplary sequences of POWER ON DIAG.

In the sequence shown in FIG. 6, when a SYS node communication test period T1 is up, the MCB subsystem sends the SYS a mode information (MODE INFO.) command 820 as shown in FIG. 15(a). The MCB holds the right to putting the machine in either the normal copy mode, i.e., the customer mode, the fault mode, or in the diag. mode. If the power switch is turned on with a fault present, the MCB instructs the fault mode to be activated; if the power switch is turned off in the diag. mode, the MCB causes the machine to enter the diag. mode at a next turning on of the power switch; and in other states, the MCB instructs the customer mode to be activated. If the power switch is turned off when the machine has already been in a fault condition, the machine must be activated in the fault mode because it must be ready to eliminate the fault when the power switch is turned on again. If the power switch is turned off with the machine in the diag. mode, the machine is activated in the diag. mode because it must continue the diag. mode when the power switch is turned on again.

Upon reception of MODE INFO. command 820 in the diag. mode, the SYS sends the IIT subsystem an NVM parameter 821 stored in the NVM. The SYS also sends the IPS subsystem an IPS INITIALIZE command 822 to initialize the IPS and thereafter sends an NVM parameter 823. Simultaneously therewith, a sensor enable (SENSOR ENABLE) signal is set to the "H" level, starting conduction at the CCD line sensor and pre-heating control. The NVM parameters sent to the IIT subsystem include the reduction/enlarging/100% magnification correction values, registration correction value in the SS direction, fail detection specification, and inching operation count at the sample position. The NVM parameters sent to the IPS subsystem include the fail detection specification, registration correction value in the main scan direction, 100% magnification correction value, platen background color level, document detection enable area, color conversion comparison range, background/foreground threshold, SS magnification correction value, color component data of registered colors (for 8 colors), and orange mask correction value. Although it is indicated in FIG. 15 that the NVM parameter is sent to the IPS subsystem as many as 9 times, this is because the volume of the data to be sent is so large that a single transmission cannot carry all the data. It should be noted that this arrangement is not essential to the invention.

The IPS, in response to the NVM parameter, returns an INITIALIZE END command 824 to the SYS. This command includes the logo data and option board data. Then, the SYS sends the IIT subsystem an INITIALIZE command 825 to initialize the IIT. As a result, the IIT is returned to the home position. This operation is to check that the IU operates correctly. The home position is checked before the IIT is reset. The SCAN RDY signal is being applied during the period between the start and stop of the IU. Upon end of the IU operation, the IIT sends the SYS an IIT READY command 826, and the SYS, upon reception of this command 826, changes the state from DIAG INITIALIZE to DIAG STAND BY. The initialization of the IIT and the IPS is thus completed. The above-described control and state change operation are performed on the three conditions: that a MODE INFO. command 820 has been sent from the MCB; that INITIALIZE END command 824 indicating the end of the IPS preparation has been sent; and that IIT READY command 826 indicating the end of the IIT preparation has been sent.

Upon entering the DIAG STAND BY, the SYS sends the MCB an INITIALIZE SUBSYSTEM command 827 indicating the end of the SYS node preparation. In response thereto, the MCB sends various detection data so that the system can identify the machine configuration including options; whether the front door, sorter door, ADF cover, and the like are opened or closed; whether the toner is supplied; whether the machine is ready to accept the start key by checking the tray state; and whether the machine is ready to accept a copy mode input.

The MCB first sends CONFIGURATION-related SUBSYSTEM STATUS commands 829 to 831 to the SYS. These commands indicate whether or not functions such as ADF, and SORTER, KEY-CODER, and AUDITRON shown in FIG. 15(b) have been added. The KEYCODER allows a number of copies specified in a card to be copied, while the AUDITRON serves to prohibit the copy operation unless it is specified to do so by a password. Such CONFIGURATION commands cause the SYS to recognize the optionally added basic functions and sends the SYSUI a CONFIGURATION command 832 simultaneously with the parameters received by an INITIALIZE END command 824 (FIG. 15(a)) from the IPS. The SYSUI sends the UI both a command 833 for specifying the number of copies to 1 with reception of the CONFIGURATION command as a trigger and a command 834 for displaying a message, causing the UI to display the message "Please wait".

The MCB further sends the SYS a TECREP as a SUBSYSTEM STATUS command 835. The TECREP means that the machine requires intervention by the service man to check if there is any fault in the sorter, the tray, or the like. When the SYS has received this command 835 and if intervention by the service man is required, the SYS sends the SYSUI a U CODE command 836, informing that the machine has a fault. The MCB also sends an operation clear (OPE CLEAR.) fault as SUBSYSTEM STATUS commands 837 to 839. The OPE CLEAR. fault indicates whether the machine can start copying on the basis of whether the doors and covers such as the front door, sorter door, and ADF cover are all closed. The SYS identifies the subsystem status with these received SUBSYSTEM STATUS commands and then sends the SYSUI these commands as a CAUTION command 840. These SUBSYSTEM STATUS commands are sent as a CAUTION command because its purpose is to "caution" the operator to the machine condition; i.e., the machine cannot start copying due to a fault that has been present prior to pressing the start key. If the front door is opened, the SYSUI informs the operator to that effect by this CAUTION command 840.

Figure 15B:
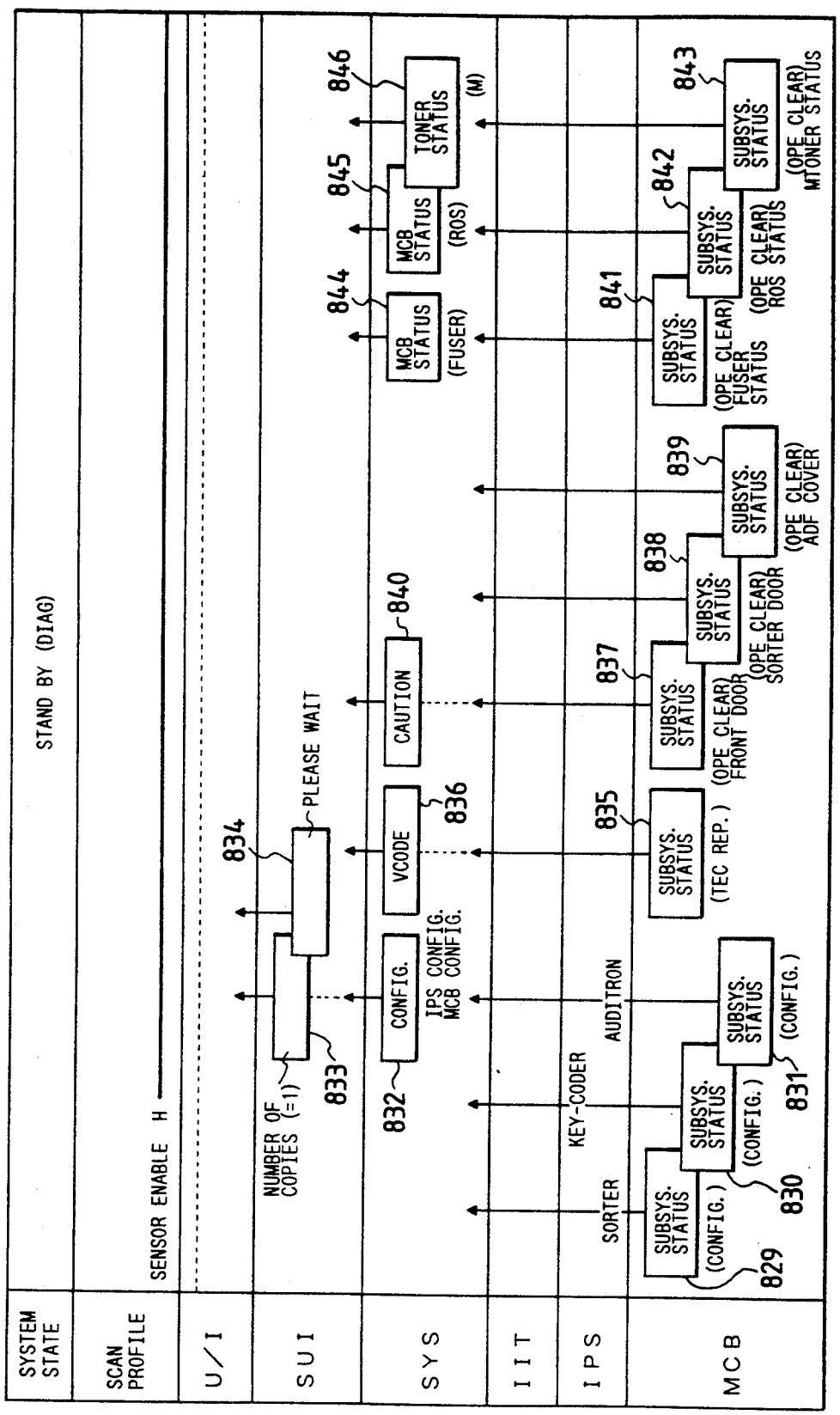
Figure 15C:
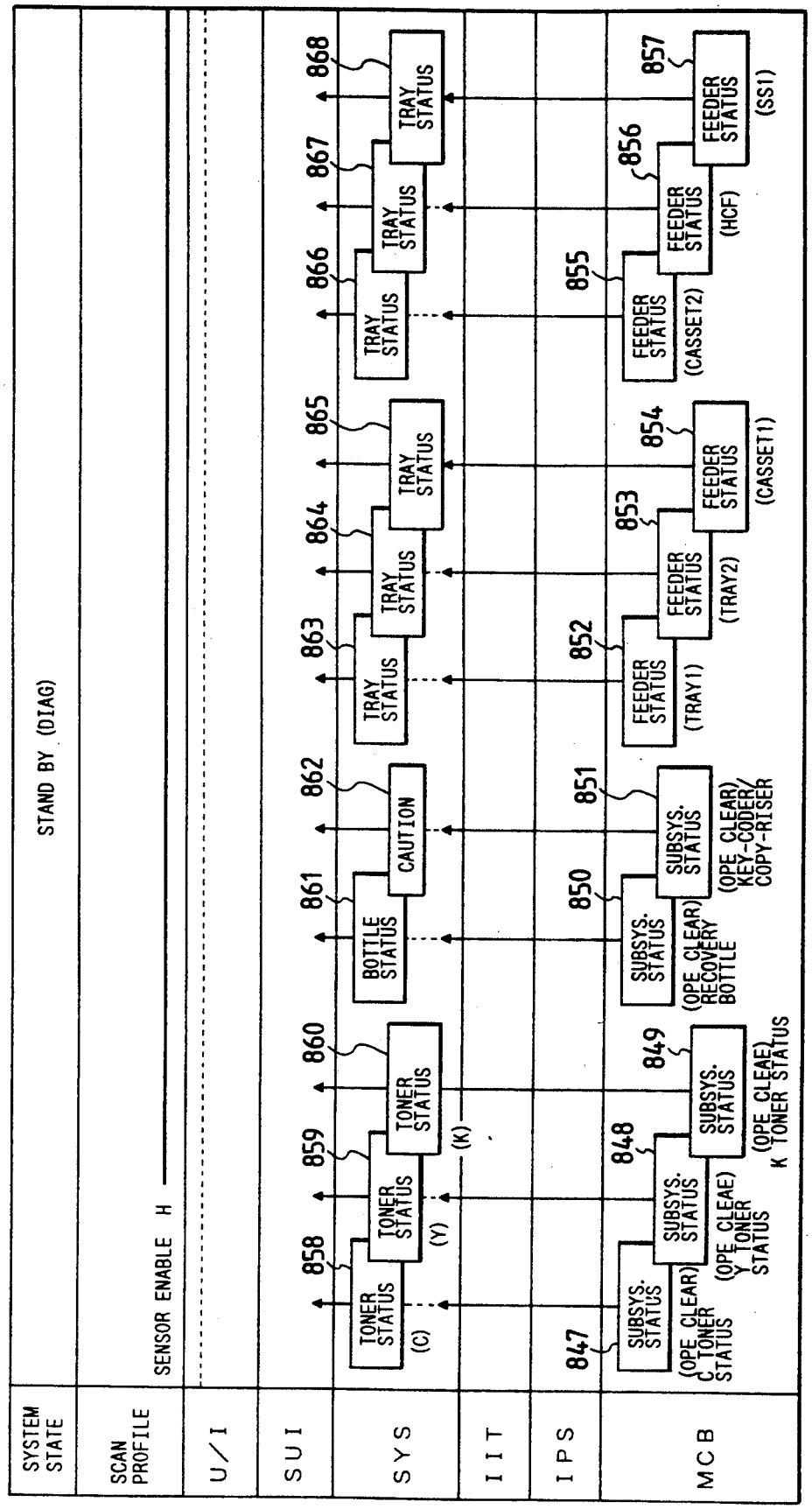
Figure 15D:
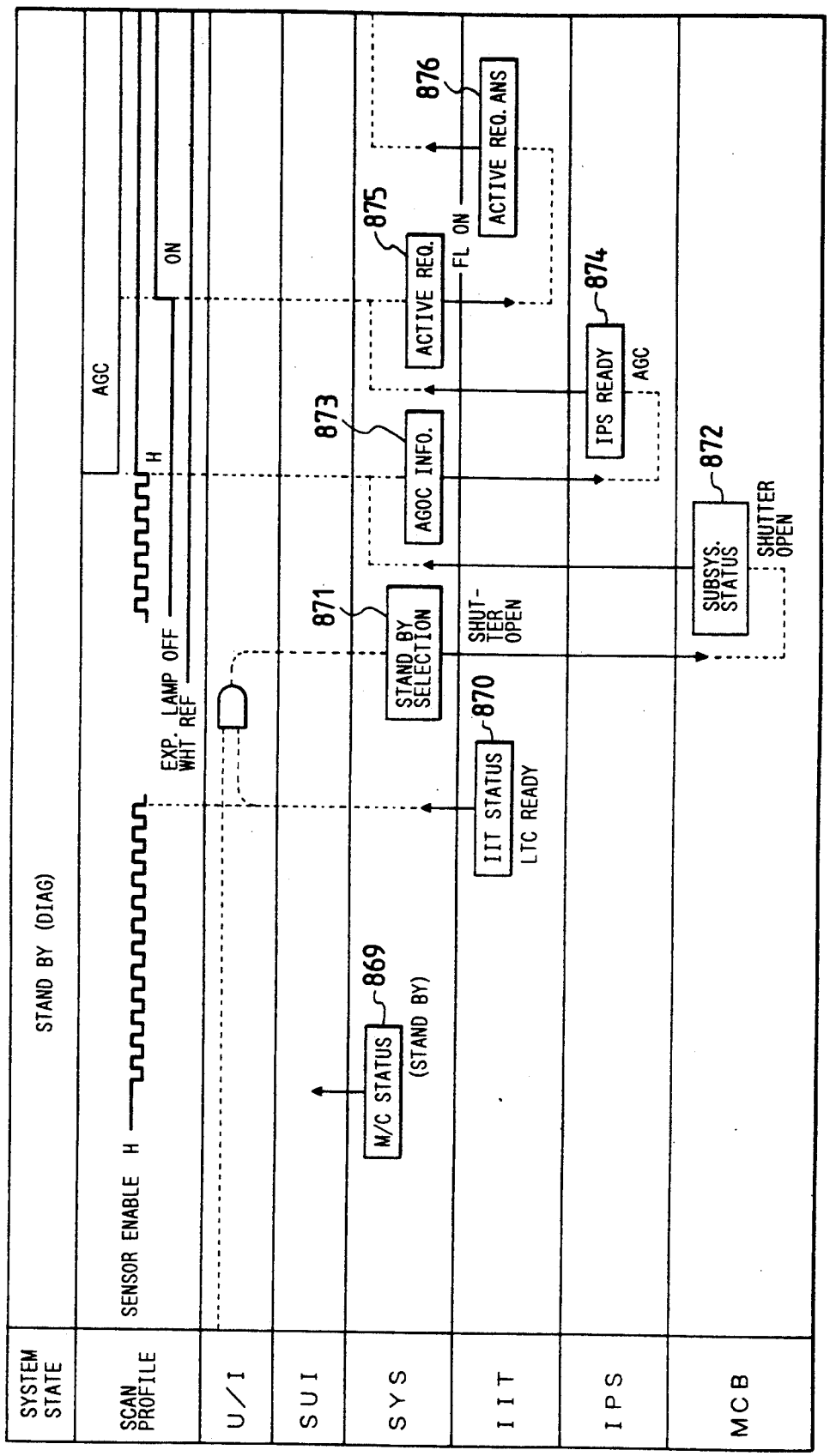

The MCB sends the SYS (FIGS. 15(b), 15(c)) such SUBSYSTEM STATUS commands as FUSER STATUS 941 indicating whether or not the fuser is missing or whether or not the fuser temperature has reached a predetermined value; ROS STATUS 842; TONER STATUSES 843, 847 to 849 indicating whether or not the toner for respective colors M, C, Y, K is supplied; RECOVERY BOTTLE STATUS 850 indicating whether or not the recovery bottle is filled up; KEY-CODER/COPY-RISER STATUS 851 indicating whether or not the key is out of place; and FEEDER STATUSES 852 to 857 for the tray, cassette, HCF (large-capacity tray), SSI (manual insertion tray), and the like. The SYS, in response thereto, sends the SYSUI these commands directly as commands 844 to 846 and 858 to 868. In case of an OPE CLEAR. fault for the KEY-CODER/COPY-RISER, a CAUTION command 862 is similarly returned to the SYSUI. As shown in FIG. 15(d), having all these status data applied, the SYS sends the SYSUI the stand by parameters as a M/C STATUS command 869 indicating that the machine is ready to accept the copy request. The SENSOR ENBL signal is set to the on/off mode from the "L" level, causing the preheat control to be started.

When the preheat control causes the heater of the exposure lamp to be maintained at a predetermined temperature, making the exposure lamp ready to emit a sufficient amount of light for exposure, the IIT subsystem sends the SYS an LTC (Lamp Temperature Control) READY signal by an IIT STATUS command 870.

The SYS, upon reception of IIT STATUS command 870 indicating LTC READY from the IIT subsystem, sends the MCB a STAND BY SELECTION command 871, requesting the opening of the shutter if it has received IIT READY command 826 shown in FIG. 15(a). In response thereto, the MCB opens the shutter and returns to the SYS a SUBSYSTEM STATUS command 872 indicating that the shutter has been opened. The SYS, upon reception of command 872, sends the IPS an AGOC INFORMATION command 873 for specifying AGC parameters. The SENSOR ENBL signal at this moment is switched from the on/off preheat mode to the "H" level mode because the image in a white color reference board (not shown) must be read to specify parameters such as AGC, AOC, and V DARK.

Upon reception of an IPS READY command 874 indicating that the machine is ready for the AGC from the IPS, the SYS sends the IIT an ACTIVE REQ. command 875. As a result, the IIT subsystem lights up the exposure lamp and sends the SYS an ACTIVE REQ. ANSWER command 876. As described above, the AGC serves to adjust the maximum value of the white signal of each channel to the reference value. The procedure of specifying the parameters is to light up the exposure lamp, read the light reflected by the white color reference board as video data, and to perform a logic operation to the video data. Thus, the exposure lamp remains turned on during this processing.

Figure 15E:
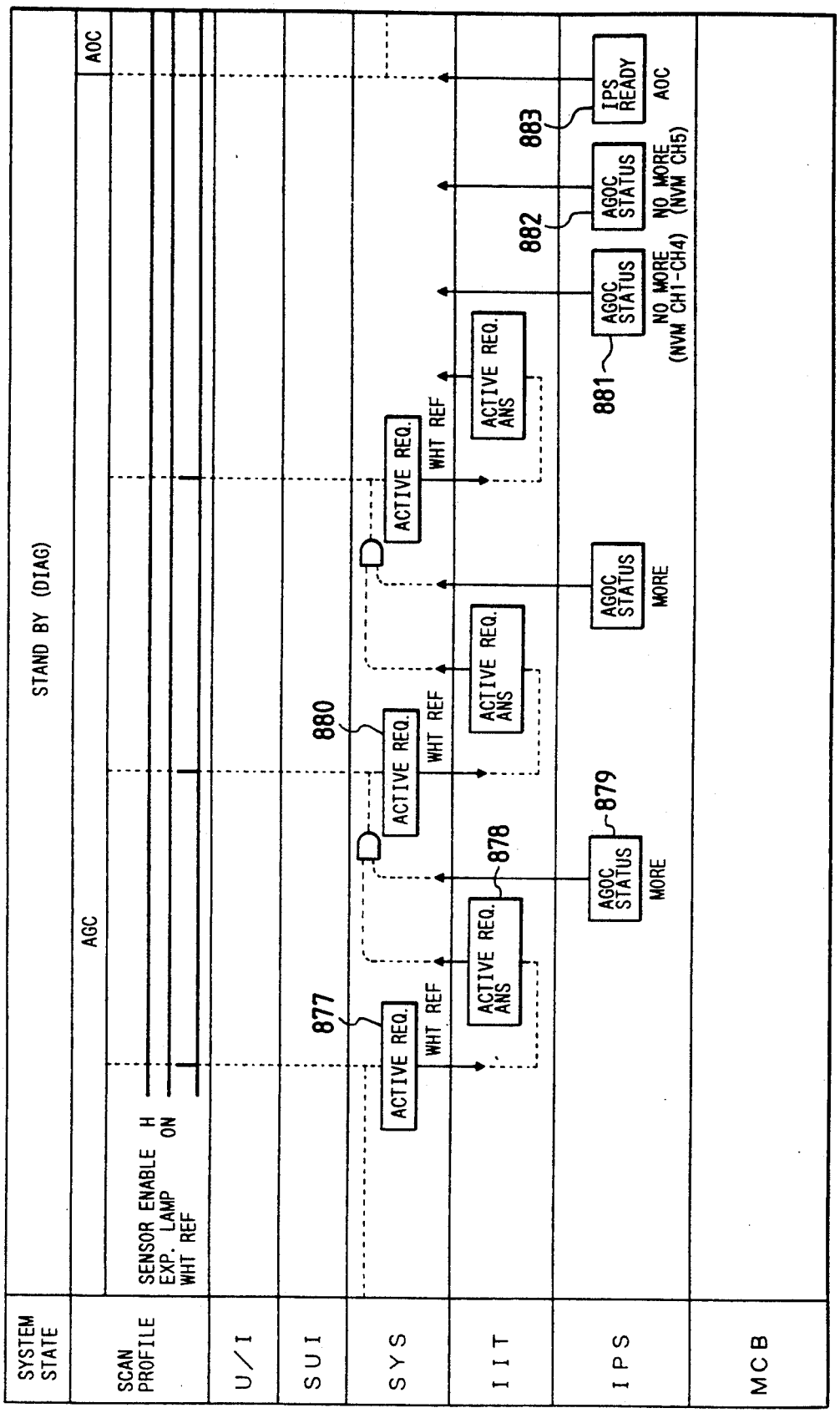

Upon confirmation that the exposure lamp has been lit up by ACTIVE REQ. ANSWER command 876, the SYS instructs the IIT to read the white reference data by an ACTIVE REQ. command 877 as shown in FIG. 15(e). On the other hand, upon confirmation that an ACTIVE REQ. ANSWER command 878, which is an answer from the IIT, and an AGOC STATUS command 879 requesting to read the white reference data again from the IPS have been received, the SYS sends the IIT an ACTIVE REQ. command 880 instructing the IIT to read the white reference data again. The SYS similarly causes the IIT to read the white reference data three times thereafter. When the last reading operation has been ended, the IPS requests the AGC parameters based on these white reference data and sends the SYS the AGC parameters for channels 1 to 5 by an AGOC STATUS command 881. The parameters are sent in two separate occasions because the parameters for all 5 channels cannot be sent in a single occasion, and it should be noted that this arrangement is not essential to the invention.

After specifying the AGC parameters in this way, the IPS sends the SYS an IPS READY command 883 indicating that it is ready to specify the AOC parameters, thereby starting to specify the AOC parameters.

Figure 15F:
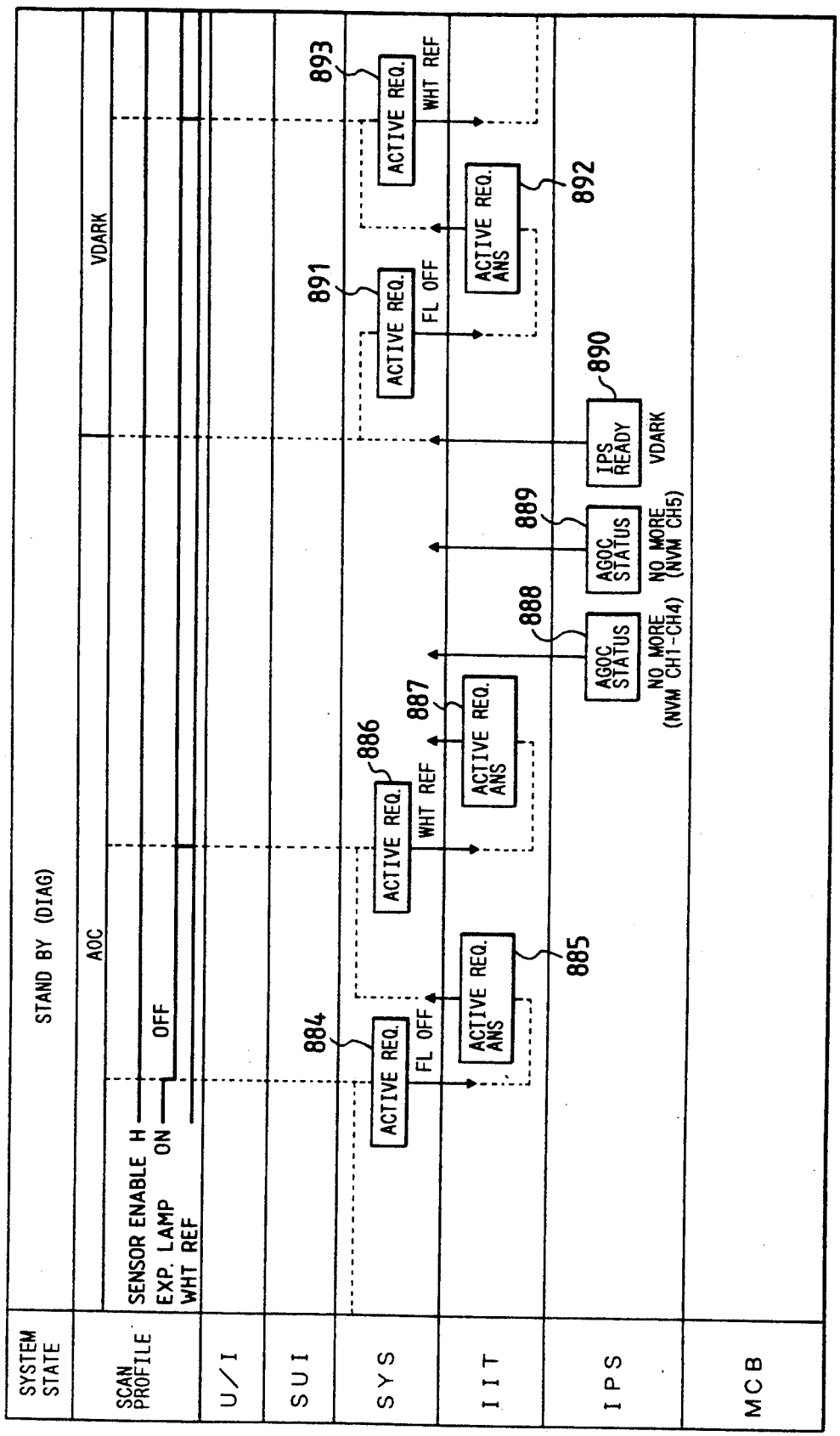

The SYS, having received IPS READY command 883, sends the IIT an ACTIVE REQ. command 884 as shown in FIG. 15(f), requesting that the exposure lamp be turned off. Since the AOC is used to adjust the minimum value of the black signal of each channel to the reference value, the parameters must be obtained from an output with the exposure lamp turned off (output in the dark). Thus, the exposure lamp must be turned off. Upon recognition that the exposure lamp has been turned off with an ACTIVE REQ. ANSWER command 885 from the IIT, the SYS sends the IIT an ACTIVE REQ. command 886, requesting the data be read in the dark. After reading, the IIT returns an ACTIVE REQ. ANSWER command 887 to the SYS, while the IPS calculates the AOC parameters based on the data read in the dark and sends the SYS the calculated AOC parameters, together with AGOC STATUS commands 888, 889. The AOC parameters are sent in two separate occasions for the same reason as in the case of the AGC parameters.

Figure 15G:
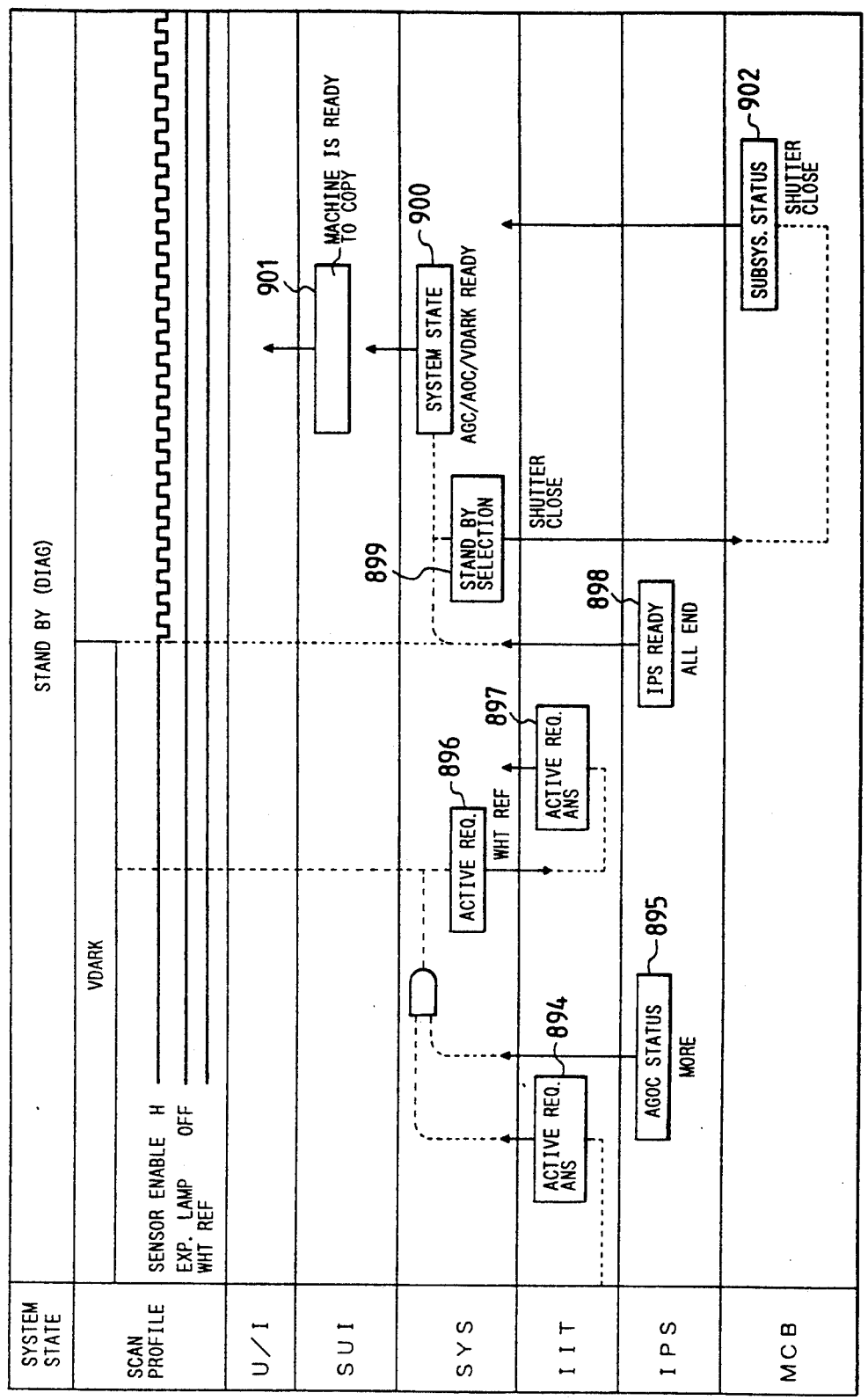

After sending the AOC parameters, the IPS informs the SYS by an IPS READY command 890 that the V DARK (VDARK) is ready, thereby causing the machine to start specifying the VDARK parameter. The SYS sends the IIT an ACTIVE REQ. command 891, requesting the exposure lamp to be turned off. Since the VDARK serves to correct the dark level of the CCD line sensor on a pixel basis, i.e., its output in the dark, the exposure lamp must be turned off to obtain the data for specifying the VDARK parameter. Upon confirmation that the exposure lamp has been turned off by the reception of an ACTIVE REQ. ANSWER command 892 from the IIT, the SYS sends the IIT an ACTIVE REQ. command 893, requesting the white reference board be read in the dark. Then, as shown in FIG. 15(g), the SYS, upon reception of both an ACTIVE REQ. ANSWER command 894 indicating the end of reading from the IIT and an AGOC STATUS command 895 requesting the data to be read again from the IPS, requests the IIT to read the data by sending an ACTIVE REQ. command 896 thereto. The IIT, upon ending the second round of reading operation, sends the SYS an ACTIVE REQ. ANSWER command 897, while the IPS, upon end of the processing of obtaining the VDARK parameter from the output in the dark, informs the SYS by an IPS READY command 898 that all the processing has been completed. This brings the processing of specifying the parameters such as AGC, AOC, and VDARK to an end. As a result, the SENSOR ENBL signal is set to the preheat mode again.

The SYS, upon reception of IPS READY command 898, not only requests the MCB to close the shutter by sending a STAND BY SELECTION command 899 thereto, but also informs the SYSUI by a SYSTEM STATE command 900 that the processing of specifying the AGC, AOC, and VDARK parameters has been completed. The MCB closes the shutter upon reception of command 899 and informs the SYS to that effect by a SUBSYSTEM STATUS command 902, while the SYS recognizes that the shutter has been closed. The SYSUI, upon reception of SYSTEM STATE command 900, sends the UI the message "Machine is ready to copy" with a MESSAGE command 901, causing the UI to display the message.

As described above, MODE INFORMATION command 820 from the MCB allows the machine to automatically enter the diag. mode, thereby contributing to helping the user easily check that there is any trouble with the machine.

What is claimed is:

1. An image recording system having a plurality of system elements including an image input terminal, an image processing system, an image output terminal, a user interface, and a control system including a central processing unit (CPU) for controlling operation of said system elements, said CPU including testing means for performing a fault check on said image recording system during a predetermined period in an activation sequence when a power supply of said image recording system has been turned on, wherein said fault check is an I/O function test performed on an input/output (I/O) port of an I/O controller of boards on which the respective system elements are mounted, and said testing means includes means for transmitting an output of predetermined bits from said output port of said I/O controller to said input port of said I/O controller.

2. The image recording system according to claim 1, wherein said testing means includes means for changing a level of said transmitted output at said output port during said predetermined period of said activation sequence, and detecting whether a level at said input port varies in accordance with said changed level of said transmitted output.

3. The image recording system according to claim 2, wherein said output port from which said output is transmitted and said input port receiving said transmitted output belong to different I/O controllers.

4. An image recording system having a plurality of system elements including an image input terminal, an image processing system, an image output terminal, a user interface, and a control system including a CPU for controlling operation of said system elements, said CPU including diagnostic means for operating in a diagnostic mode to perform a diagnostic test on said image recording system on a condition that a predetermined operation other than turning on and off of a power supply of said image recording system has been performed at said user interface, wherein said diagnostic means includes means for providing a diagnostic copy mode in which a copy job is performed in the same manner as in a normal, non-diagnostic copy mode of said image recording system.

5. The image recording system according to claim 4, wherein said diagnostic means includes means, operative in said diagnostic copy mode, for displaying a pattern substantially equal to that displayed in said normal copy mode on a screen of said user interface, wherein a background color of said pattern displayed in said diagnostic copy mode is different from that of said pattern displayed in said normal copy mode.

6. The image recording system according to claim 4, wherein said copy job in said diagnostic copy mode is performed without billing.

7. An image recording system having a plurality of system elements including an image input terminal, an image processing system, an image output terminal, a user interface, and a control system including a CPU for controlling operation of said system elements, said CPU including means for operating in a diagnostic mode to perform a diagnostic test on said image recording system on a condition that said image output terminal has detected that said image recording system is in a predetermined state when a power supply of said image recording system has been turned on, wherein said diagnostic means includes means for providing a copy mode in which a copy job is performed in response to a predetermined condition.

8. An image recording system having a plurality of system elements including an image input terminal, an image processing system, an image output terminal, a user interface, and a control system including a central processing unit (CPU) for controlling operation of said system elements, said CPU including testing means for performing a fault check on said image recording system during a predetermined period in an activation sequence when a power supply of said image recording system has been turned on, wherein said fault check is an interrupt function test performed on said CPU, and said testing means includes interrupt function test signal means for invalidating a level change at an interrupt signal input terminal of said control system during said predetermined period of said activation sequence, inputting an interrupt function test signal to said interrupt signal input terminal within said predetermined period, and detecting an occurrence of an interrupt in said CPU.

9. The image recording system according to claim 8, wherein said testing means performs said interrupt function test with respect to an interrupt request generated by an interrupt signal produced from a circuit board of said image recording system other than a circuit board on which said CPU is mounted.

10. The image recording system according to claim 9, wherein said interrupt request is generated when an imaging unit in said image input terminal has started scanning, when said imaging unit has started reading a document image, when said imaging unit has ended reading said document image, and when said imaging unit has ended scanning.

11. The image recording system according to claim 8, wherein said interrupt function test signal means is mounted on the same circuit board on which said CPU is mounted.

12. An image recording system having a plurality of system elements including an image input terminal, an image processing system, an image output terminal, a user interface, and a control system including a CPU for controlling operation of said system elements, said CPU including diagnostic means for operating in a diagnostic mode to perform a diagnostic test on said image recording system on a condition that a predetermined operation other than turning on and off of a power supply of said image recording system has been performed at said user interface, wherein said diagnostic means includes means for providing a diagnostic copy mode in which a copy job is performed in response to a predetermined condition.

13. The image recording system according to claim 12, wherein said diagnostic means includes means, operative in said diagnostic copy mode, for producing a copy corresponding to a video signal generated from a pattern generator.

14. The image recording system according to claim 13, wherein said pattern generator is arranged at said image output terminal.

* * * * *